(12) United States Patent  (10) Patent No.: US 8,333,327 B2
Akiyama  (45) Date of Patent: Dec. 18, 2012

(54) APPARATUS, SYSTEM, AND METHOD OF IMAGE PROCESSING

(75) Inventor: Toshio Akiyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 338 days.

(21) Appl. No.: 12/659,157

(22) Filed: Feb. 26, 2010

(65) Prior Publication Data

US 2010/0230493 A1    Sep. 16, 2010

(30) Foreign Application Priority Data

Mar. 12, 2009   (JP) .................... 2009-059832

(51) Int. Cl.
 G06K 19/06   (2006.01)
(52) U.S. Cl. ................. 235/462.25; 235/462.08
(58) Field of Classification Search ............ 235/462.09, 235/462.11, 462.08, 462.25
See application file for complete search history.

(56) References Cited

U.S. PATENT DOCUMENTS 5,550,365 A * 8/1996 Klancnik et al. ........ 235/462.25
2008/0219553 A1  9/2008 Akiyama

FOREIGN PATENT DOCUMENTS

| JP | 62-120585 | 6/1987 |
| JP | 3376175 | 11/2002 |
| JP | 2006-209449 | 8/2006 |
| JP | 2008-040557 | 2/2008 |

OTHER PUBLICATIONS

English language abstract of JP 09-022437, Jan. 21, 1997, Japan.

* cited by examiner

*Primary Examiner* — Karl D Frech
(74) *Attorney, Agent, or Firm* — Harness, Dickey & Pierce, P.L.C.

(57) ABSTRACT

A barcode detection device performs a barcode detection analysis operation of detecting and analyzing a barcode in image data to generate a barcode detection result. An image processor performs an image processing operation of applying image processing to the image data to generate processed image data when the barcode detection indicates an error in barcode detection or analysis. The controller causes the image processor and the barcode detection device to sequentially perform a plurality of retry operations each of which including a set of the image processing operation and the barcode detection analysis operation until one or more successful detection results are obtained, while causing the image processor to change a type of the image processing being applied for each retry operation.

24 Claims, 34 Drawing Sheets

FIG. 8

| IMAGE NO. | FILE NAME | P0 | P1 | P2 | P3 | P4 | P5 | P6 | P11 | P12 | P7 | P8 | P9 | P10 | HITS |
|---|---|---|---|---|---|---|---|---|---|---|---|---|---|---|---|
| 1 | 00000027.TIF |  |  | 1 | 1 |  |  |  |  |  | 1 |  | 1 |  | 4 |
| 2 | 00000052.TIF |  |  |  | 1 |  | 1 |  |  |  |  |  |  |  | 2 |
| 3 | 00000070.TIF |  | 1 | 1 | 1 | 1 | 1 | 1 | 1 | 1 | 1 | 1 | 1 | 1 | 12 |
| 4 | 00000127.TIF |  | 1 | 1 | 1 |  | 1 |  |  |  | 1 |  | 1 |  | 6 |
| 5 | 00000158.TIF |  |  |  |  | 1 |  |  | 1 |  |  |  |  |  | 2 |
| 6 | 00000301.TIF |  | 1 | 1 |  | 1 | 1 | 1 |  |  | 1 | 1 | 1 | 1 | 9 |
| 7 | 00000452.TIF |  |  | 1 |  |  |  |  |  |  |  |  | 1 |  | 2 |
| 8 | 00000571.TIF |  |  |  |  |  | 1 |  | 1 |  |  |  |  |  | 2 |
| 9 | 00000575.TIF |  | 1 | 1 | 1 |  |  | 1 |  |  |  | 1 | 1 |  | 7 |
| 10 | 00000617.TIF |  |  |  |  |  |  |  |  | 1 |  | 1 | 1 |  | 3 |
| 11 | 00000638.TIF |  | 1 | 1 |  | 1 | 1 |  |  |  | 1 | 1 | 1 |  | 7 |
| 12 | 00000779.TIF |  |  |  |  |  | 1 |  |  |  |  |  |  |  | 1 |
| 13 | 00000798.TIF |  |  |  |  |  | 1 |  | 1 |  |  |  |  |  | 2 |
| 14 | 00000821.TIF |  |  |  |  |  |  |  |  |  |  |  |  |  | 0 |
| 15 | 00000827.TIF |  | 1 | 1 |  | 1 | 1 | 1 |  |  | 1 | 1 | 1 | 1 | 10 |
| 16 | 00000860.TIF |  | 1 | 1 |  | 1 | 1 | 1 | 1 | 1 | 1 | 1 | 1 | 1 | 11 |
| 17 | 00000869.TIF |  |  |  |  |  |  |  |  |  |  |  | 1 |  | 1 |
| 18 | 00000901.TIF |  |  | 1 |  | 1 |  | 1 |  |  | 1 | 1 | 1 | 1 | 7 |
| 19 | 00000906.TIF |  | 1 | 1 |  | 1 | 1 | 1 |  |  | 1 | 1 | 1 | 1 | 9 |
| 20 | 00000954.TIF |  |  |  |  | 1 |  |  | 1 |  |  |  | 1 |  | 3 |
| 21 | 00000957.TIF |  |  |  |  |  |  |  |  |  |  |  | 1 |  | 1 |
| 22 | 00000977.TIF |  |  |  |  |  |  |  |  |  |  |  |  |  | 0 |
| 23 | 00000985.TIF |  | 1 | 1 |  | 1 | 1 | 1 | 1 |  | 1 | 1 | 1 | 1 | 11 |
| 24 | 00000993.TIF |  |  |  |  |  |  |  |  |  | 1 | 1 | 1 |  | 3 |
| 25 | 00001016.TIF |  |  |  |  |  |  | 1 | 1 |  | 1 | 1 | 1 | 1 | 6 |
| 26 | 00001039.TIF |  |  |  | 1 |  |  |  |  |  |  | 1 |  |  | 2 |
| 27 | 00001092.TIF |  | 1 | 1 |  |  |  |  |  |  |  | 1 |  |  | 3 |
| 28 | 00001145.TIF |  |  |  |  |  |  |  |  |  |  |  |  |  | 0 |
| 29 | 00001154.TIF |  | 1 | 1 | 1 | 1 | 1 | 1 | 1 | 1 | 1 | 1 | 1 | 1 | 12 |
| 30 | 00001291.TIF |  | 1 |  |  |  | 1 |  |  |  |  | 1 | 1 |  | 4 |
| 31 | 00001295.TIF |  | 1 | 1 |  | 1 | 1 | 1 | 1 |  | 1 | 1 |  |  | 8 |
| 32 | 00001314.TIF |  | 1 | 1 |  | 1 | 1 | 1 |  |  | 1 | 1 | 1 |  | 8 |
| 33 | 00001320.TIF |  |  | 1 |  |  | 1 |  |  |  |  |  | 1 |  | 3 |
| 34 | 00001340.TIF |  |  | 1 |  |  |  |  |  |  |  | 1 |  |  | 2 |
| 35 | 00001408.TIF |  | 1 |  |  |  |  |  |  |  |  |  | 1 | 1 | 3 |
| 36 | 00001435.TIF |  | 1 |  |  | 1 | 1 | 1 |  |  |  |  | 1 | 1 | 6 |
| 37 | 00001446.TIF |  | 1 | 1 |  | 1 | 1 | 1 |  |  | 1 | 1 | 1 | 1 | 10 |
| 38 | 00001484.TIF |  | 1 | 1 |  |  |  |  |  |  |  |  |  |  | 2 |
| 39 | 00001485.TIF |  | 1 | 1 |  | 1 | 1 |  | 1 |  | 1 | 1 | 1 |  | 8 |
| 40 | 00001499.TIF |  |  | 1 |  |  |  |  |  |  |  |  |  |  | 1 |
| 41 | 00001503.TIF |  | 1 | 1 | 1 | 1 |  | 1 |  |  |  |  |  |  | 5 |
| 42 | 00001553.TIF |  | 1 | 1 |  | 1 | 1 | 1 |  |  | 1 | 1 | 1 | 1 | 9 |

FIG. 10

| IMAGE NO. | FILE NAME | P0 | P1 | P2 | P3 | P7 | P8 | P9 | P10 | P4 | P5 | P6 | P11 | P12 | HITS |
|---|---|---|---|---|---|---|---|---|---|---|---|---|---|---|---|
| 1 | 00000027.TIF | | | 1 | 1 | 1 | | 1 | | | | | | | 4 |
| 2 | 00000052.TIF | | | | 1 | | | | | | 1 | | | | 2 |
| 3 | 00000070.TIF | | 1 | 1 | 1 | 1 | 1 | 1 | 1 | 1 | 1 | 1 | 1 | 1 | 12 |
| 4 | 00000127.TIF | | 1 | 1 | 1 | 1 | | 1 | | | 1 | | | | 6 |
| 5 | 00000158.TIF | | | | | | | | | | 1 | | 1 | | 2 |
| 6 | 00000301.TIF | | 1 | 1 | | 1 | 1 | 1 | 1 | 1 | 1 | 1 | | | 9 |
| 7 | 00000452.TIF | | | 1 | | | | 1 | | | | | | | 2 |
| 8 | 00000571.TIF | | | | | | | | | | 1 | | 1 | | 2 |
| 9 | 00000575.TIF | | | 1 | 1 | 1 | | 1 | 1 | | | | 1 | 1 | 7 |
| 10 | 00000617.TIF | | | | | | | 1 | 1 | | | | 1 | | 3 |
| 11 | 00000638.TIF | | 1 | 1 | | 1 | 1 | 1 | | | 1 | 1 | | | 7 |
| 12 | 00000779.TIF | | | | | | | | 1 | | | | | | 1 |
| 13 | 00000798.TIF | | | | | | | | | | 1 | | 1 | | 2 |
| 15 | 00000827.TIF | | 1 | 1 | | 1 | 1 | 1 | 1 | 1 | 1 | 1 | 1 | | 10 |
| 16 | 00000860.TIF | | 1 | 1 | | 1 | 1 | 1 | 1 | 1 | 1 | 1 | 1 | 1 | 11 |
| 17 | 00000869.TIF | | | | | | | | 1 | | | | | | 1 |
| 18 | 00000901.TIF | | | 1 | | 1 | 1 | 1 | 1 | | 1 | | | | 7 |
| 19 | 00000906.TIF | | 1 | 1 | | 1 | 1 | 1 | 1 | 1 | 1 | 1 | | | 9 |
| 20 | 00000954.TIF | | | | | 1 | | | | | 1 | | 1 | | 3 |
| 21 | 00000957.TIF | | | | | | | 1 | | | | | | | 1 |
| 23 | 00000985.TIF | | 1 | 1 | | 1 | 1 | 1 | 1 | 1 | 1 | 1 | 1 | 1 | 11 |
| 24 | 00000993.TIF | | | | | 1 | 1 | 1 | | | | | | | 3 |
| 25 | 00001016.TIF | | | | | 1 | 1 | 1 | 1 | | | 1 | 1 | | 6 |
| 26 | 00001039.TIF | | | | | 1 | | | | 1 | | | | | 2 |
| 27 | 00001092.TIF | | 1 | 1 | | 1 | | | | | | | | | 3 |
| 29 | 00001154.TIF | | 1 | 1 | 1 | 1 | 1 | 1 | 1 | 1 | 1 | 1 | 1 | 1 | 12 |
| 30 | 00001291.TIF | | 1 | | | | 1 | 1 | | | 1 | | | | 4 |
| 31 | 00001295.TIF | | 1 | 1 | | 1 | | | | | 1 | 1 | 1 | 1 | 8 |
| 32 | 00001314.TIF | | 1 | 1 | | 1 | | 1 | | | 1 | 1 | 1 | 1 | 8 |
| 33 | 00001320.TIF | | | | 1 | | | 1 | | | 1 | | | | 3 |
| 34 | 00001340.TIF | | | | 1 | | | | | | 1 | | | | 2 |
| 35 | 00001408.TIF | | 1 | | | | | 1 | 1 | | | | | | 3 |
| 36 | 00001435.TIF | | 1 | | | | | 1 | 1 | 1 | 1 | 1 | | | 6 |
| 37 | 00001446.TIF | | 1 | 1 | | 1 | 1 | 1 | 1 | 1 | 1 | 1 | 1 | | 10 |
| 38 | 00001484.TIF | | 1 | 1 | | | | | | | | | | | 2 |
| 39 | 00001485.TIF | | 1 | 1 | | | 1 | | | 1 | 1 | | 1 | 1 | 8 |
| 40 | 00001499.TIF | | | 1 | | | | | | | | | | | 1 |
| 41 | 00001503.TIF | | 1 | 1 | 1 | | | | | | 1 | | 1 | | 5 |
| 42 | 00001553.TIF | | 1 | 1 | | 1 | 1 | 1 | 1 | | 1 | 1 | 1 | | 9 |

FIG. 11

| IMAGE NO. | FILE NAME | P0 | P1 | P2 | P3 | P7 | P8 | P9 | P10 | P4 | P5 | P6 | P11 | P12 | HITS |
|---|---|---|---|---|---|---|---|---|---|---|---|---|---|---|---|
| 1 | 00000027.TIF |  |  | 1 | 1 | 1 |  | 1 |  |  |  |  |  |  | 4 |
| 2 | 00000052.TIF |  |  |  | 1 |  |  |  |  |  | 1 |  |  |  | 2 |
| 3 | 00000070.TIF |  | 1 | 1 | 1 | 1 | 1 | 1 | 1 | 1 | 1 | 1 | 1 | 1 | 12 |
| 4 | 00000127.TIF |  | 1 | 1 | 1 | 1 |  |  |  |  | 1 | 1 |  |  | 6 |
| 5 | 00000158.TIF |  |  |  |  |  |  |  |  |  | 1 |  | 1 |  | 2 |
| 6 | 00000301.TIF |  | 1 | 1 |  | 1 | 1 | 1 | 1 | 1 | 1 | 1 |  |  | 9 |
| 7 | 00000452.TIF |  |  | 1 |  |  |  | 1 |  |  |  |  |  |  | 2 |
| 8 | 00000571.TIF |  |  |  |  |  |  |  |  |  | 1 |  | 1 |  | 2 |
| 9 | 00000575.TIF |  | 1 | 1 | 1 |  | 1 | 1 |  |  |  | 1 | 1 |  | 7 |
| 10 | 00000617.TIF |  |  |  |  |  | 1 | 1 |  |  |  |  | 1 |  | 3 |
| 11 | 00000638.TIF |  | 1 | 1 |  | 1 | 1 | 1 |  | 1 | 1 |  |  |  | 7 |
| 13 | 00000798.TIF |  |  |  |  |  |  |  |  |  | 1 |  | 1 |  | 2 |
| 15 | 00000827.TIF |  | 1 | 1 |  | 1 | 1 | 1 | 1 | 1 | 1 | 1 | 1 |  | 10 |
| 16 | 00000860.TIF |  | 1 | 1 |  | 1 | 1 | 1 | 1 | 1 | 1 | 1 | 1 | 1 | 11 |
| 18 | 00000901.TIF |  |  | 1 |  | 1 | 1 | 1 | 1 | 1 |  | 1 |  |  | 7 |
| 19 | 00000906.TIF |  | 1 | 1 |  | 1 | 1 | 1 | 1 | 1 | 1 | 1 |  |  | 9 |
| 20 | 00000954.TIF |  |  |  |  | 1 |  |  |  |  | 1 |  | 1 |  | 3 |
| 23 | 00000985.TIF |  | 1 | 1 |  | 1 | 1 | 1 | 1 | 1 | 1 | 1 | 1 | 1 | 11 |
| 24 | 00000993.TIF |  |  |  |  | 1 | 1 |  |  |  |  |  | 1 |  | 3 |
| 25 | 00001016.TIF |  |  |  |  | 1 | 1 | 1 | 1 |  |  | 1 | 1 |  | 6 |
| 26 | 00001039.TIF |  |  |  |  | 1 |  |  |  |  | 1 |  |  |  | 2 |
| 27 | 00001092.TIF |  | 1 | 1 |  | 1 |  |  |  |  |  |  |  |  | 3 |
| 29 | 00001154.TIF |  | 1 | 1 | 1 | 1 | 1 | 1 | 1 | 1 | 1 | 1 | 1 | 1 | 12 |
| 30 | 00001291.TIF |  | 1 |  |  | 1 | 1 |  | 1 |  |  |  |  |  | 4 |
| 31 | 00001295.TIF |  | 1 | 1 |  | 1 |  |  |  | 1 | 1 | 1 | 1 | 1 | 8 |
| 32 | 00001314.TIF |  | 1 | 1 |  | 1 | 1 |  |  | 1 | 1 | 1 | 1 |  | 8 |
| 33 | 00001320.TIF |  |  |  |  |  |  |  |  |  |  | 1 |  |  | 3 |
| 34 | 00001340.TIF |  |  | 1 |  |  |  |  |  |  |  |  |  |  | 2 |
| 35 | 00001408.TIF |  | 1 |  |  |  |  |  |  | 1 | 1 |  |  |  | 3 |
| 36 | 00001435.TIF |  | 1 |  |  |  |  |  |  | 1 | 1 | 1 | 1 |  | 6 |
| 37 | 00001446.TIF |  | 1 | 1 |  | 1 | 1 | 1 |  | 1 | 1 | 1 | 1 |  | 10 |
| 38 | 00001484.TIF |  | 1 | 1 |  |  |  |  |  |  |  |  |  |  | 2 |
| 39 | 00001485.TIF |  | 1 | 1 |  |  |  | 1 | 1 |  | 1 | 1 | 1 | 1 | 8 |
| 41 | 00001503.TIF |  | 1 | 1 | 1 |  |  |  |  |  | 1 |  | 1 |  | 5 |
| 42 | 00001553.TIF |  | 1 | 1 |  | 1 | 1 | 1 |  | 1 | 1 | 1 | 1 |  | 9 |

FIG. 12

| IMAGE NO. | FILE NAME | P0 | P1 | P2 | P3 | P7 | P8 | P9 | P10 | P4 | P5 | P6 | P11 | P12 | HITS |
|---|---|---|---|---|---|---|---|---|---|---|---|---|---|---|---|
| 5 | 00000158.TIF |  |  |  |  |  |  |  |  |  | 1 |  | 1 |  | 2 |
| 20 | 00000954.TIF |  |  |  |  | 1 |  |  |  |  | 1 |  | 1 |  | 3 |
| 26 | 00001039.TIF |  |  |  |  | 1 |  |  |  |  | 1 |  |  |  | 2 |

FIG. 14

| IMAGE NO. | FILE NAME | P0 | P1 | P2 | P3 | P7 | P8 | P9 | P10 | P4 | P5 | P6 | P11 | P12 | HITS |
|---|---|---|---|---|---|---|---|---|---|---|---|---|---|---|---|
| 1 | 00000027.TIF |  |  | 1 | 1 | 1 |  | 1 |  |  |  |  |  |  | 4 |
| 2 | 00000052.TIF |  |  |  | 1 |  |  |  |  |  | 1 |  |  |  | 2 |
| 3 | 00000070.TIF |  | 1 | 1 | 1 | 1 | 1 | 1 | 1 | 1 | 1 | 1 | 1 | 1 | 12 |
| 4 | 00000127.TIF |  | 1 | 1 | 1 | 1 |  | 1 |  |  | 1 |  |  |  | 6 |
| 5 | 00000158.TIF |  |  |  |  |  |  |  |  | 1 |  |  | 1 |  | 2 |
| 6 | 00000301.TIF |  | 1 | 1 |  | 1 | 1 | 1 | 1 | 1 | 1 | 1 |  |  | 9 |
| 7 | 00000452.TIF |  |  | 1 |  |  |  | 1 |  |  |  |  |  |  | 2 |
| 8 | 00000571.TIF |  |  |  |  |  |  |  |  |  | 1 |  | 1 |  | 2 |
| 9 | 00000575.TIF |  | 1 | 1 | 1 |  | 1 | 1 |  |  |  | 1 | 1 |  | 7 |
| 10 | 00000617.TIF |  |  |  |  |  | 1 | 1 |  |  |  |  | 1 |  | 3 |
| 11 | 00000638.TIF |  | 1 | 1 |  | 1 | 1 | 1 |  | 1 | 1 |  |  |  | 7 |
| 13 | 00000798.TIF |  |  |  |  |  |  |  |  |  | 1 |  | 1 |  | 2 |
| 15 | 00000827.TIF |  | 1 | 1 |  | 1 | 1 | 1 | 1 | 1 | 1 | 1 | 1 |  | 10 |
| 16 | 00000860.TIF |  | 1 | 1 |  | 1 | 1 | 1 | 1 | 1 | 1 | 1 | 1 | 1 | 11 |
| 18 | 00000901.TIF |  |  | 1 |  | 1 | 1 | 1 | 1 | 1 |  | 1 |  |  | 7 |
| 19 | 00000906.TIF |  | 1 | 1 |  | 1 | 1 | 1 | 1 | 1 | 1 | 1 |  |  | 9 |
| 20 | 00000954.TIF |  |  |  | 1 |  |  | 1 |  |  |  |  | 1 |  | 3 |
| 23 | 00000985.TIF |  | 1 | 1 |  | 1 | 1 | 1 | 1 | 1 | 1 | 1 | 1 | 1 | 11 |
| 24 | 00000993.TIF |  |  |  |  | 1 | 1 | 1 |  |  |  |  |  |  | 3 |
| 25 | 00001016.TIF |  |  |  |  | 1 | 1 | 1 | 1 |  |  | 1 | 1 |  | 6 |
| 26 | 00001039.TIF |  |  |  |  |  | 1 |  |  |  | 1 |  |  |  | 2 |
| 27 | 00001092.TIF |  | 1 | 1 |  |  |  |  |  |  |  |  | 1 |  | 3 |
| 29 | 00001154.TIF |  | 1 | 1 | 1 | 1 | 1 | 1 | 1 | 1 | 1 | 1 | 1 | 1 | 12 |
| 30 | 00001291.TIF | 1 |  |  |  | 1 | 1 |  | 1 |  |  |  |  |  | 4 |
| 31 | 00001295.TIF | 1 | 1 |  |  | 1 |  |  |  | 1 | 1 | 1 | 1 | 1 | 8 |
| 32 | 00001314.TIF | 1 | 1 |  |  | 1 |  |  |  | 1 | 1 | 1 | 1 | 1 | 8 |
| 33 | 00001320.TIF |  |  | 1 |  |  | 1 |  |  |  | 1 |  |  |  | 3 |
| 34 | 00001340.TIF |  |  | 1 |  |  | 1 |  |  |  |  |  |  |  | 2 |
| 35 | 00001408.TIF | 1 |  |  |  |  |  | 1 |  |  |  | 1 |  |  | 3 |
| 36 | 00001435.TIF | 1 |  |  |  |  | 1 | 1 | 1 |  | 1 | 1 |  |  | 6 |
| 37 | 00001446.TIF | 1 | 1 |  | 1 | 1 | 1 | 1 | 1 | 1 | 1 | 1 |  |  | 10 |
| 38 | 00001484.TIF | 1 | 1 |  |  |  |  |  |  |  |  |  |  |  | 2 |
| 39 | 00001485.TIF | 1 | 1 |  |  | 1 | 1 |  |  | 1 |  |  | 1 | 1 | 8 |
| 41 | 00001503.TIF | 1 | 1 | 1 |  |  |  |  |  | 1 |  | 1 |  |  | 5 |
| 42 | 00001553.TIF |  | 1 | 1 |  | 1 | 1 | 1 | 1 | 1 | 1 | 1 |  |  | 9 |

FIG. 15

| IMAGE NO. | FILE NAME | P0 | P1 | P2 | P3 | P7 | P8 | P9 | P10 | P4 | P5 | P6 | P11 | P12 | HITS |
|---|---|---|---|---|---|---|---|---|---|---|---|---|---|---|---|
| 1 | 00000027.TIF | | | 1 | 1 | 1 | | 1 | | | | | | | 4 |
| 3 | 00000070.TIF | | 1 | 1 | 1 | 1 | 1 | 1 | 1 | 1 | 1 | 1 | 1 | 1 | 12 |
| 4 | 00000127.TIF | | 1 | 1 | 1 | 1 | | 1 | | | | 1 | | | 6 |
| 6 | 00000301.TIF | | 1 | 1 | | 1 | 1 | 1 | 1 | 1 | 1 | 1 | | | 9 |
| 9 | 00000575.TIF | | 1 | 1 | 1 | | | 1 | | | | | 1 | 1 | 7 |
| 10 | 00000617.TIF | | | | | | 1 | 1 | | | | | 1 | | 3 |
| 11 | 00000638.TIF | | 1 | 1 | | 1 | 1 | 1 | | | 1 | 1 | | | 7 |
| 15 | 00000827.TIF | | 1 | 1 | | 1 | 1 | 1 | 1 | 1 | 1 | | 1 | 1 | 10 |
| 16 | 00000860.TIF | | 1 | 1 | | 1 | 1 | 1 | 1 | 1 | 1 | 1 | 1 | 1 | 11 |
| 18 | 00000901.TIF | | | 1 | | 1 | 1 | 1 | 1 | 1 | | 1 | | | 7 |
| 19 | 00000906.TIF | | 1 | 1 | | 1 | 1 | 1 | 1 | 1 | 1 | 1 | | | 9 |
| 20 | 00000954.TIF | | | | | 1 | | | | 1 | | | 1 | | 3 |
| 23 | 00000985.TIF | | 1 | 1 | | 1 | 1 | 1 | 1 | 1 | 1 | 1 | 1 | 1 | 11 |
| 24 | 00000993.TIF | | | | | 1 | 1 | 1 | | | | | | | 3 |
| 25 | 00001016.TIF | | | | | 1 | 1 | 1 | 1 | | | 1 | 1 | | 6 |
| 27 | 00001092.TIF | 1 | 1 | | | 1 | | | | | | | | | 3 |
| 29 | 00001154.TIF | | 1 | 1 | 1 | 1 | 1 | 1 | 1 | 1 | 1 | 1 | 1 | 1 | 12 |
| 30 | 00001291.TIF | | 1 | | | 1 | 1 | | 1 | | | | | | 4 |
| 31 | 00001295.TIF | | 1 | 1 | | 1 | | | | 1 | 1 | 1 | 1 | 1 | 8 |
| 32 | 00001314.TIF | | 1 | 1 | | 1 | | | 1 | 1 | 1 | 1 | | | 8 |
| 33 | 00001320.TIF | | | 1 | | | 1 | | | | 1 | | | | 3 |
| 35 | 00001408.TIF | | 1 | | | | | 1 | 1 | | | | | | 3 |
| 36 | 00001435.TIF | | 1 | | | | | 1 | 1 | 1 | 1 | 1 | | | 6 |
| 37 | 00001446.TIF | | 1 | 1 | | 1 | 1 | 1 | 1 | 1 | 1 | 1 | 1 | | 10 |
| 39 | 00001485.TIF | | 1 | 1 | | 1 | 1 | | 1 | 1 | | | 1 | 1 | 8 |
| 41 | 00001503.TIF | | 1 | 1 | 1 | | | | | 1 | | 1 | | | 5 |
| 42 | 00001553.TIF | | 1 | 1 | | 1 | 1 | 1 | 1 | 1 | 1 | 1 | | | 9 |

|  | NO CHECK DIGIT | WITH CHECK DIGIT |
|---|---|---|
| CODE39 | 1/3M | 1/149M |
| NW7 | 1/1M | 1/1B |

FIG. 19

| IMAGE PROCESSING | DESCRIPTION | IMAGE PROCESSING DEGREE |
|---|---|---|
| P0 | ORIGINAL IMAGE | NO |
| P2 | ROTATE BY 180 DEGREES | NO |
| P3 | ROTATE BY 270 DEGREES | NO |
| P1 | ROTATE BY 90 DEGREES | NO |
| P9 | NOISE REMOVAL 2dot + SMOOTHING + 180ROTATE | MEDIUM |
| P7 | NOISE REMOVAL 2dot + SMOOTHING | MEDIUM |
| P8 | NOISE REMOVAL 2dot + SMOOTHING + 90ROTATE | MEDIUM |
| P10 | NOISE REMOVAL 2dot + SMOOTHING + 270ROTATE | MEDIUM |
| P4 | GRAYSCALE SMOOTHING | MEDIUM |
| P6 | GRAYSCALE WEIGHTED AVERAGE SMOOTHING | MEDIUM |
| P5 | GRAYSCALE REDUCTION 70% | HIGH |
| P11 | GRAYSCALE, HIGH IMAGE QUALITY, ENLARGE 200% | HIGH |
| P12 | MONOCHROME, ENLARGE 300% | HIGH |

| | 26 | 27 | 28 | 29 | 30 | 31 | 32 | 33 | 34 | 35 | 36 | 37 | 38 | 39 | 40 | 41 | 42 | C1 | C2 | C3 | C4 | C5 | C6 |
|---|---|---|---|---|---|---|---|---|---|---|---|---|---|---|---|---|---|---|---|---|---|---|---|
| | | | | | | | | | | | | | | | | | | 0 | 0.383 | NO | 42 | 10.1 | 10.1 |
| | | 1 | | 1 | | 1 | 1 | 1 | 1 | | | 1 | | | | | 1 | 26 | 0.525 | HIGH | 42 | 22.1 | 38.2 |
| | | | | 1 | | 1 | 1 | 1 | | | 1 | 1 | | | 1 | | 1 | 24 | 0.443 | NO | 16 | 18.6 | 56.8 |
| | | | | 1 | 1 | 1 | | 1 | | 1 | 1 | 1 | | | | | 1 | 21 | 0.449 | NO | 11 | 7.2 | 64.0 |
| | 1 | | | 1 | | 1 | 1 | 1 | | 1 | 1 | 1 | | | | | 1 | 21 | 0.512 | HIGH | 11 | 5.6 | 69.6 |
| | 1 | | | 1 | 1 | 1 | | | 1 | 1 | 1 | 1 | 1 | | 1 | | | 20 | 0.817 | MEDIUM | 10 | 9.0 | 78.6 |
| | | | | 1 | | 1 | | | | 1 | | 1 | | 1 | | | 1 | 20 | 0.347 | HIGH | 8 | 3.5 | 82.0 |
| | | | | 1 | | 1 | | | | | 1 | 1 | | | | | | 16 | 0.524 | HIGH | 4 | 4.2 | 86.2 |
| | | 1 | | 1 | | | 1 | | 1 | 1 | 1 | 1 | 1 | | | | 1 | 16 | 0.826 | HIGH | 4 | 3.3 | 89.5 |
| | | | | | | 1 | | | | | 1 | | | | | | | 16 | 1.560 | MEDIUM | 4 | 6.2 | 95.8 |
| | | 1 | | 1 | 1 | 1 | 1 | 1 | | | 1 | 1 | 1 | | 1 | 1 | 1 | 14 | 0.512 | HIGH | 3 | 2.0 | 97.8 |
| | | | | | | | | | | | | | | | | | | 7 | 0.449 | NO | 3 | 1.8 | 99.6 |
| | 2 | 3 | 0 | 12 | 4 | 8 | 8 | 3 | 2 | 3 | 6 | 10 | 2 | 8 | 11 | 5 | 9 | 6 | 1.922 | MEDIUM | | 5.8 | 105.4 | sec
min
1.8

| | 26 | 27 | 28 | 29 | 30 | 31 | 32 | 33 | 34 | 35 | 36 | 37 | 38 | 39 | 40 | 41 | 42 | C1 | C2 | C3 | C4 | C5 | C6 |
|---|---|---|---|---|---|---|---|---|---|---|---|---|---|---|---|---|---|---|---|---|---|---|---|
| | | | | | | | | | | | | | | | | | | 0 | 0.360 | NO | 42 | 16.1 | 16.1 |
| | | | | | | | | 1 | | | | | | | | 1 | 20 | 0.347 | HIGH | 42 | 14.6 | 30.7 |
| | | | | 1 | | | 1 | | | | 1 | 1 | 1 | 1 | | 1 | 24 | 0.443 | NO | 22 | 9.7 | 40.4 |
| | | | | | | | 1 | | | 1 | | 1 | | 1 | | 1 | 21 | 0.449 | NO | 13 | 5.8 | 46.3 |
| | | | 1 | | | | | | | | 1 | | | | | 1 | 7 | 0.512 | NO | 11 | 4.9 | 51.2 |
| | | 1 | | | 1 | | 1 | | 1 | 1 | 1 | | 1 | 1 | | 1 | 21 | 0.512 | HIGH | 9 | 4.6 | 55.8 |
| | | | 1 | | 1 | | | | | 1 | | 1 | | | | 1 | 14 | 0.524 | HIGH | 7 | 3.6 | 59.4 |
| | | | | | 1 | | | | 1 | 1 | 1 | | | | | 1 | 16 | 0.525 | HIGH | 6 | 3.1 | 62.5 |
| | 1 | 1 | 1 | 1 | | 1 | | 1 | 1 | 1 | 1 | 1 | 1 | | | 1 | 26 | 0.617 | HIGH | 5 | 2.6 | 65.1 |
| | | | | 1 | 1 | 1 | | | | | 1 | | 1 | 1 | | 1 | 20 | 0.826 | MEDIUM | 4 | 3.3 | 68.4 |
| | | | | | 1 | | 1 | | | | | | 1 | 1 | 1 | 1 | 16 | 0.826 | HIGH | 3 | 2.5 | 70.9 |
| | 1 | | | | | | | | | | | | | | | 1 | 16 | 1.560 | MEDIUM | 3 | 4.7 | 75.6 |
| | | | | | | | | | | | | | | | | | 6 | 1.922 | MEDIUM | 3 | 5.8 | 81.3 |
| | 2 | 3 | 0 | 11 | 4 | 7 | 8 | 3 | 2 | 3 | 6 | 10 | 2 | 7 | 1 | 5 | 9 | | | | | | 1.3 sec/min |

| | 26 | 27 | 28 | 29 | 30 | 31 | 32 | 33 | 34 | 35 | 36 | 37 | 38 | 39 | 40 | 41 | 42 | C1 | C2 | C3 | C4 | C5 | C6 |
|---|---|---|---|---|---|---|---|---|---|---|---|---|---|---|---|---|---|---|---|---|---|---|---|
| | | | | | | | | | | | | | | | | | | 0 | 0.383 | NO | 42 | 16.1 | 16.1 |
| | 1 | 1 | | | | 1 | 1 | 1 | 1 | 1 | 1 | 1 | | 1 | | | | 26 | 0.525 | HIGH | 16 | 8.4 | 24.5 |
| | | | | | 1 | | | | | | | | | | | | | 24 | 0.443 | NO | 18 | 8.0 | 32.5 |
| | | | | 1 | 1 | 1 | 1 | 1 | 1 | 1 | 1 | | 1 | | | | 21 | 0.512 | HIGH | 11 | 5.6 | 38.1 |
| | | | | 1 | 1 | 1 | 1 | 1 | 1 | 1 | 1 | 1 | 1 | | | | 20 | 0.347 | HIGH | 10 | 3.5 | 41.6 |
| | | | | 1 | 1 | 1 | 1 | 1 | | 1 | 1 | | 1 | | | | 20 | 0.817 | MEDIUM | 6 | 4.9 | 46.5 |
| | | | | 1 | | | 1 | | | | 1 | 1 | 1 | | | | 14 | 0.512 | HIGH | 4 | 2.0 | 48.5 |
| | | | | 1 | 1 | 1 | 1 | | 1 | 1 | 1 | | | | | | 21 | 0.449 | NO | 3 | 1.3 | 49.9 |
| | | | | | | | | | | | | | | | | | 16 | 1.560 | MEDIUM | 3 | 4.7 | 54.6 |
| | | | | 1 | 1 | 1 | 1 | 1 | 1 | 1 | 1 | | 1 | | | | 7 | 0.449 | NO | 3 | 1.3 | 55.9 |
| | | | | | | | | | | | | | | | | | 16 | 0.524 | HIGH | 3 | 1.6 | 57.5 |
| | | | 1 | 1 | | | | | | | | | 1 | | | | 16 | 0.826 | HIGH | 3 | 2.5 | 60.0 |
| | | | | | | | | | | | | | | | | | 6 | 1.922 | MEDIUM | 3 | 5.8 | 65.7 |
| | 2 | 3 | 0 | 12 | 4 | 8 | 8 | 3 | 2 | 3 | 6 | 10 | 2 | 8 | 1 | 5 | 9 | | | | | | 1.1 sec/min |

FIG. 26A

| RETRY NO. | IMAGE PROCESSING | IMAGE NO. → 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | HITS |
|---|---|---|---|---|---|---|---|---|---|---|---|---|---|---|---|---|---|---|---|---|---|---|---|---|---|---|---|
| 1 | P0 |  |  | 1 | 1 |  | 1 | 1 |  | 1 | 1 | 1 |  |  |  |  |  |  |  |  |  |  |  |  |  |  | 4 |
| 7 | P9 | 1 | 1 | 1 | 1 | 1 | 1 | 1 |  | 1 | 1 | 1 |  |  |  |  |  |  |  |  |  |  |  |  |  |  | 2 |
| 3 | P2 |  | 1 | 1 | 1 | 1 | 1 | 1 |  | 1 | 1 | 1 |  |  |  |  |  |  |  |  |  |  |  |  |  |  | 12 |
| 2 | P1 |  | 1 | 1 | 1 | 1 |  |  |  |  | 1 |  | 1 |  | 1 | 1 | 1 | 1 | 1 | 1 | 1 | 1 | 1 | 1 | 1 | 1 | 0 |
| 6 | P8 |  | 1 | 1 | 1 | 1 | 1 |  |  | 1 | 1 | 1 | 1 |  | 1 | 1 | 1 | 1 | 1 | 1 | 1 | 1 | 1 | 1 | 1 | 1 | 2 |
| 9 | P4 |  | 1 | 1 | 1 |  | 1 | 1 |  | 1 | 1 | 1 | 1 |  | 1 | 1 | 1 | 1 | 1 | 1 | 1 | 1 | 1 | 1 | 1 | 1 | 0 |
| 10 | P5 |  | 1 |  |  | 1 |  | 1 |  |  |  | 1 |  |  | 1 | 1 |  | 1 | 1 | 1 | 1 | 1 | 1 | 1 |  |  | 2 |
| 5 | P7 |  |  |  |  |  |  |  | 1 |  | 1 | 1 |  | 1 | 1 | 1 | 1 | 1 | 1 | 1 |  | 1 | 1 | 1 | 1 | 1 | 2 |
| 11 | P6 |  |  |  |  |  |  |  | 1 |  |  | 1 |  |  | 1 | 1 | 1 | 1 | 1 | 1 | 1 | 1 | 1 | 1 | 1 | 1 | 2 |
| 12 | P11 |  |  |  |  |  | 1 |  |  | 1 | 1 |  |  |  |  | 1 | 1 |  | 1 | 1 | 1 | 1 | 1 | 1 | 1 | 1 | 9 |
| 8 | P10 |  |  |  |  |  |  |  |  | 1 |  |  |  |  |  | 1 | 1 |  |  |  |  |  | 1 | 1 | 1 | 1 | 11 |
| 4 | P3 |  |  | 1 |  |  |  |  |  |  |  |  |  |  |  |  |  |  |  |  |  |  |  | 1 | 1 | 1 | 1 | 11 |
| 13 | P12 |  |  |  |  |  |  |  |  |  |  |  |  |  |  |  |  |  |  |  |  |  |  |  |  |  |  | 6 |
| HITS |  | 4 | 2 | 12 | 6 | 2 | 9 | 2 | 2 | 7 | 3 | 7 | 1 | 2 | 0 | 10 | 11 | 1 | 7 | 9 | 3 | 1 | 0 | 11 | 5 | 6 |  |

FIG. 26B

| | 26 | 27 | 28 | 29 | 30 | 31 | 32 | 33 | 34 | 35 | 36 | 37 | 38 | 39 | 40 | 41 | 42 | C1 | C2 | C3 | C4 | C5 | C8 |
|---|---|---|---|---|---|---|---|---|---|---|---|---|---|---|---|---|---|---|---|---|---|---|---|
| | | | | | | | | 1 | | | | | | | | | | 0 | 0.383 | NO | 42 | 16.1 | 16.1 |
| | | 1 | | | | | 1 | | | | | | | | | | 1 | 26 | 0.525 | HIGH | 42 | 22.1 | 38.2 |
| | | 1 | | | | | | | | | | | 1 | | | | 1 | 24 | 0.443 | NO | 42 | 18.6 | 56.8 |
| | | | | | | | 1 | 1 | | | | | | | | | 1 | 21 | 0.449 | NO | 19 | 18.9 | 75.6 |
| | 1 | | | | 1 | | | | | | 1 | 1 | | | | | | 21 | 0.512 | HIGH | 16 | 9.7 | 85.4 |
| | | 1 | | | 1 | | 1 | | | | | | | | | | 1 | 20 | 0.817 | MEDIUM | 13 | 13.1 | 98.4 |
| | | | | 1 | 1 | 1 | | | | | | | | | | | 1 | 20 | 0.347 | HIGH | 12 | 4.5 | 103.0 |
| | | 1 | | 1 | | | | | | 1 | | | | | | | 1 | 18 | 0.524 | HIGH | 12 | 6.3 | 109.2 |
| | | | | 1 | | 1 | | | | | | | | | | | 1 | 16 | 0.826 | HIGH | 11 | 9.9 | 119.2 |
| | | 1 | | | | 1 | | | | | | | | | | | 1 | 16 | 1.560 | MEDIUM | 11 | 17.2 | 136.3 |
| | | | | | | | | | | | | | | | | | 1 | 14 | 0.512 | HIGH | 8 | 5.6 | 141.9 |
| | | | | 1 | | | | | | | | | 1 | | 1 | | 1 | 7 | 0.449 | NO | 8 | 3.6 | 145.5 |
| | 1 | | | | | | | | 1 | | | | | | | | | 6 | 1.922 | MEDIUM | 7 | 15.4 | 160.9 |
| | 2 | 3 | 0 | 12 | 4 | 8 | 8 | 3 | 2 | 3 | 6 | 10 | 2 | 8 | 1 | 5 | 9 | | | | | | 2.7 | sec / min

| RETRY NO | IMAGE NO → / IMAGE PROCESSING ↓ | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| 1 | P0 | 1 |   | 1 | 1 |   | 1 | 1 |   | 1 | 1 | 1 |   |   |   |   |   |   |   |   |   |   |   |   |   |   |
| 7 | P9 |   |   | 1 | 1 |   | 1 | 1 |   | 1 | 1 | 1 |   |   |   | 1 | 1 | 1 | 1 | 1 |   | 1 |   | 1 |   |   |
| 3 | P2 | 1 |   | 1 | 1 |   | 1 | 1 |   | 1 | 1 |   |   |   |   | 1 | 1 |   | 1 | 1 |   |   |   | 1 |   |   |
| 6 | P8 |   |   |   |   |   |   |   | 1 |   |   |   |   |   |   | 1 | 1 | 1 | 1 | 1 |   |   |   | 1 |   |   |
| 2 | P1 | 1 |   | 1 | 1 |   | 1 | 1 |   | 1 | 1 | 1 |   |   |   | 1 | 1 |   | 1 | 1 |   |   |   | 1 |   |   |
| 4 | P3 |   | 1 | 1 | 1 |   | 1 |   |   | 1 |   | 1 |   |   |   | 1 | 1 |   | 1 | 1 |   |   |   | 1 |   |   |
| 9 | P4 |   |   | 1 |   |   | 1 |   |   |   |   |   |   |   |   | 1 | 1 |   | 1 | 1 |   |   |   | 1 |   |   |
| 10 | P5 |   |   |   |   |   | 1 |   |   |   |   |   |   |   |   | 1 | 1 |   |   |   |   |   |   | 1 |   |   |
| 12 | P11 |   |   |   |   |   |   |   |   |   |   |   |   |   |   |   | 1 |   |   |   |   | 1 |   | 1 | 1 | 1 |
| 8 | P10 |   |   |   |   |   | 1 |   |   |   |   |   |   |   |   | 1 | 1 |   |   |   |   | 1 |   | 1 |   |   |
| 11 | P6 |   |   | 1 | 1 |   | 1 |   |   |   |   |   |   |   |   | 1 | 1 |   |   |   |   |   |   | 1 | 1 | 1 |
| 5 | P7 |   |   | 1 | 1 |   | 1 | 1 |   | 1 |   |   |   |   |   | 1 | 1 | 1 | 1 | 1 |   | 1 |   | 1 |   |   |
| 13 | P12 |   |   | 1 |   |   | 1 |   |   |   |   |   |   |   |   |   |   |   |   |   |   |   |   | 1 |   |   |
|  | HITS | 4 | 2 | 12 | 6 | 2 | 9 | 2 | 2 | 7 | 3 | 7 | 1 | 1 | 2 | 10 | 11 | 1 | 7 | 9 | 3 | 1 | 0 | 11 | 3 | 6 |

FIG. 28B

| | 26 | 27 | 28 | 29 | 30 | 31 | 32 | 33 | 34 | 35 | 36 | 37 | 38 | 39 | 40 | 41 | 42 | C1 | C2 | C3 | C4 | C5 | C6 |
|---|---|---|---|---|---|---|---|---|---|---|---|---|---|---|---|---|---|---|---|---|---|---|---|
| | | | | | | | | | | | | | | | | | | 0 | | | | | |
| | | 1 | | 1 | 1 | 1 | 1 | 1 | | | | 1 | | | | | 1 | 26 | 0.383 | NO | 42 | 16.1 | 16.1 |
| | | 1 | | 1 | 1 | 1 | | 1 | | | 1 | 1 | | | | | 1 | 24 | 0.525 | HIGH | 42 | 22.1 | 38.2 |
| | | | | 1 | 1 | 1 | 1 | | | | | 1 | | | | | 1 | 21 | 0.443 | NO | 42 | 18.6 | 56.8 |
| | | | 1 | 1 | 1 | 1 | 1 | | | 1 | | 1 | | | | | 1 | 21 | 0.512 | HIGH | 20 | 21.5 | 78.3 |
| | 1 | | | 1 | | | | | | | 1 | 1 | | | | | 1 | 7 | 0.449 | NO | 15 | 9.0 | 87.3 |
| | | | | 1 | 1 | 1 | 1 | | | | | 1 | | | | | 1 | 20 | 0.449 | NO | 13 | 3.1 | 129.1 |
| | | | | 1 | 1 | 1 | 1 | | | | | 1 | 1 | | | | 1 | 20 | 0.817 | MEDIUM | 12 | 12.3 | 99.5 |
| | | | | 1 | 1 | 1 | | | | | | 1 | | | | | 1 | 16 | 0.347 | HIGH | 11 | 4.2 | 103.7 |
| | | | | 1 | 1 | 1 | | | | | | 1 | | | | | 1 | 14 | 1.560 | MEDIUM | 10 | 17.2 | 120.8 |
| | | | | 1 | 1 | 1 | 1 | | | | | 1 | | | | | 1 | 16 | 0.512 | HIGH | 7 | 5.1 | 126.0 |
| | | | | 1 | 1 | 1 | 1 | | | | | 1 | 1 | | | | | 16 | 0.826 | HIGH | 7 | 5.8 | 141.7 |
| | | | | 1 | 1 | 1 | 1 | | | | | 1 | | | | | | 16 | 0.524 | HIGH | 7 | 6.8 | 135.9 |
| | 2 | 3 | 0 | 12 | 4 | 8 | 8 | 3 | 2 | 3 | 8 | 10 | 2 | 8 | 1 | 5 | 9 | 6 | 1.922 | MEDIUM | 7 | 13.5 | 165.1 sec / 2.6 min |

FIG. 29

| IMAGE PROCESSING | PROCESSING TIME (sec) | PROCESSING TIME INCREASE | DETECTION ERROR | DETECTION ERROR RATE |
|---|---|---|---|---|
| NO | 3,067 | 0.0% | 42 | 0.53% |
| ALL | 74,158 | 2317.9% | 3 | 0.04% |
| HITS, 1 | 3,152 | 2.8% | 3 | 0.04% |
| SPEED, 1 | 3,128 | 2.0% | 3 | 0.04% |
| OPTIMIZED, 1 | 3,112 | 1.5% | 3 | 0.04% |
| QR, ALL | 28,318 | 823.3% | 3 | 0.04% |
| HITS, 2 | 3,208 | 4.6% | 7 | 0.09% |
| SPEED, 2 | 3,180 | 3.7% | 7 | 0.09% |
| OPTIMIZED, 2 | 3,202 | 4.4% | 7 | 0.09% |
| CODE 39, ALL | 43,886 | 1330.9% | 7 | 0.09% |

APPARATUS, SYSTEM, AND METHOD OF IMAGE PROCESSING

CROSS-REFERENCE TO RELATED APPLICATIONS

This patent application is based on and claims priority under 35 U.S.C. §119 to Japanese Patent Application No. 2009-059832, filed on Mar. 12, 2009, in the Japanese Patent Office, the disclosure of which is hereby incorporated herein by reference.

FIELD OF THE INVENTION

The present invention generally relates to an apparatus, system, and method of image processing, and more specifically to an apparatus, system, and method of applying image processing to image data when a barcode in the image data is not successfully obtained.

BACKGROUND

With the wide spread use of a barcode, a document management system may be provided to manage a document using a barcode attached to the document. For example, the document management system includes a scanner that scans the document embedded with the barcode into image data, and an information processing apparatus that detects the barcode in the image data to manage the document using the detected barcode.

In order to accurately and efficiently manage the document, the barcode attached to the document needs to be accurately detected with the reduced processing speed. Since the barcode is generated in compliance with the standard, barcode detection should be made relatively easily as compared to the case of reading the document using the optical character recognition (OCR). However, the barcode may not be accurately detected, for example, due to the characteristics of the image data provided by the scanner to the information processing apparatus.

Japanese Patent Application Publication No. 2006-209449 describes a technique of enlarging the size of image data for barcode detection when the barcode is not successfully detected.

However, if the image data size subjected for processing increases, the overall processing time required for barcode detection may increase. Further, increasing the image data size alone may not be effective especially when the image data itself is not in good quality.

SUMMARY

In view of the above, the inventor of the present invention has discovered that there is a need for applying image processing to the image data scanned from the original document such that the barcode can be easily detected using the processed image data. While there may be a wide range of image processing that can enhance the image quality, it was not recommended to apply image processing to the image data before barcode detection as image processing may change information embedded in the barcode.

As described in the specification, the inventor of the present invention has discovered that effectively applying image processing to the image data greatly improves the barcode detection probability.

Example embodiments of the present invention include an image processing apparatus including a barcode detection device, an image processor, and a controller. The barcode detection device performs a barcode detection analysis operation of detecting and analyzing a barcode in image data to generate a barcode detection result. The image processor performs an image processing operation of applying image processing to the image data to generate processed image data when the barcode detection result indicates an error in barcode detection or analysis. The controller causes the image processor and the barcode detection device to sequentially perform a plurality of retry operations each of which including a set of the image processing operation and the barcode detection analysis operation until one or more successful detection results are obtained, while causing the image processor to change a type of the image processing being applied for each retry operation.

Example embodiments of the present invention include an image processing system including an image data generating apparatus and an image processing apparatus. The image data generating apparatus generates image data. The image processing apparatus includes a barcode detection device, an image processor, and a controller. The barcode detection device performs a barcode detection analysis operation of detecting and analyzing a barcode in image data to generate a barcode detection result. The image processor performs an image processing operation of applying image processing to the image data to generate processed image data when the barcode detection result indicates an error in barcode detection or analysis. The controller causes the image processor and the barcode detection device to sequentially perform a plurality of retry operations each of which including a set of the image processing operation and the barcode detection analysis operation until one or more successful detection results are obtained, while causing the image processor to change a type of the image processing being applied for each retry operation.

Example embodiments of the present invention include a multifunctional apparatus including a barcode detection device, an image processor, and a controller. The barcode detection device performs a barcode detection analysis operation of detecting and analyzing a barcode in image data to generate a barcode detection result. The image processor performs an image processing operation of applying image processing to the image data to generate processed image data when the barcode detection result indicates an error in barcode detection or analysis. The controller causes the image processor and the barcode detection device to sequentially perform a plurality of retry operations each of which including a set of the image processing operation and the barcode detection analysis operation until one or more successful detection results are obtained, while causing the image processor to change a type of the image processing being applied for each retry operation. The multifunctional apparatus may additionally include a scanner that scans an original document into the image data for further processing, or a facsimile device that receives the image data for further processing.

Example embodiments of the present invention include an image processing method including the steps of: performing a barcode detection analysis operation of detecting and analyzing a barcode in image data to generate a barcode detection result; performing an image processing operation of applying image processing to the image data to generate processed image data when the barcode detection result indicates an error in barcode detection or analysis; and sequentially performing a plurality of retry operation each of which including a set of the image processing operation and the barcode detection analysis operation until one or more successful detection results are obtained, while changing a type of the image processing being applied for each retry operation.

In addition to the above-described example embodiments, the present invention may be practiced in various other ways, for example, as a computer-readable program that causes a computer to function as the above-described apparatus or system or carry out the above-described method, or a recording medium storing such computer-readable program.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is a table illustrating the barcode detection results obtained after applying a different type of image processing to the image data;

FIG. 10 is a table generated based on the table of FIG. 8 by eliminating the samples having the number of successful detection results of "0";

FIG. 11 is a table generated based on the table of FIG. 10 by eliminating the samples having the number of successful detection results of "1";

FIG. 12 is a table generated based on the table of FIG. 11 by eliminating the samples having the number of successful detection results of more than one with respect to the image processing selected based on FIG. 11;

FIG. 14 is a table generated based on the table of FIG. 8 by eliminating the samples having the number of successful detection results equal to or less than "1";

FIG. 15 is a table generated based on the table of FIG. 14 by eliminating the samples having the number of successful detection results of "2";

FIG. 19 is an illustration for explaining characteristics of each type of image processing available for use by the image processing server, according to an example embodiment of the present invention;

FIGS. 23A and 23B ("FIG. 23") are a table storing processing order information indicating the order of performing a plurality of types of image processing, which is determined based on the number of successful detection results, in case when the retry number information indicates to repeat the retry operation until one successful detection result is obtained;

FIGS. 24A and 24B ("FIG. 24") are a table storing processing order information indicating the order of performing a plurality of types of image processing, which is determined based on the processing time, in case when the retry number information indicates to repeat the retry operation until one successful detection result is obtained;

FIGS. 25A and 25B ("FIG. 25") are a table storing processing order information indicating the optimized order of performing a plurality of types of image processing, which is determined based on the type of image processing in addition to the successful detection results and the processing time, in the case when the retry number information indicates to repeat the retry operation until one successful detection result is obtained;

FIGS. 26A and 26B ("FIG. 26") are a table storing processing order information indicating the order of performing a plurality of types of image processing, which is determined based on the number of successful detection results, in case when the retry number information indicates to repeat the retry operation until two successful detection results are obtained;

FIGS. 27A and 27B ("FIG. 27") are a table storing processing order information indicating the order of performing a plurality of types of image processing, which is determined based on the processing time, in case when the retry number information indicates to repeat the retry operation until two successful detection results are obtained;

FIGS. 28A and 28B ("FIG. 28") are a table storing processing order information indicating the optimized order of performing a plurality of types of image processing, which is determined based on the type of image processing in addition to the successful detection results and the processing time, in the case when the retry number information indicates to repeat the retry operation until two successful detection results are obtained;

FIG. 29 is an illustration for explaining the overall processing time and the barcode detection error rate for a different pattern of retry operation;

Figure 1:
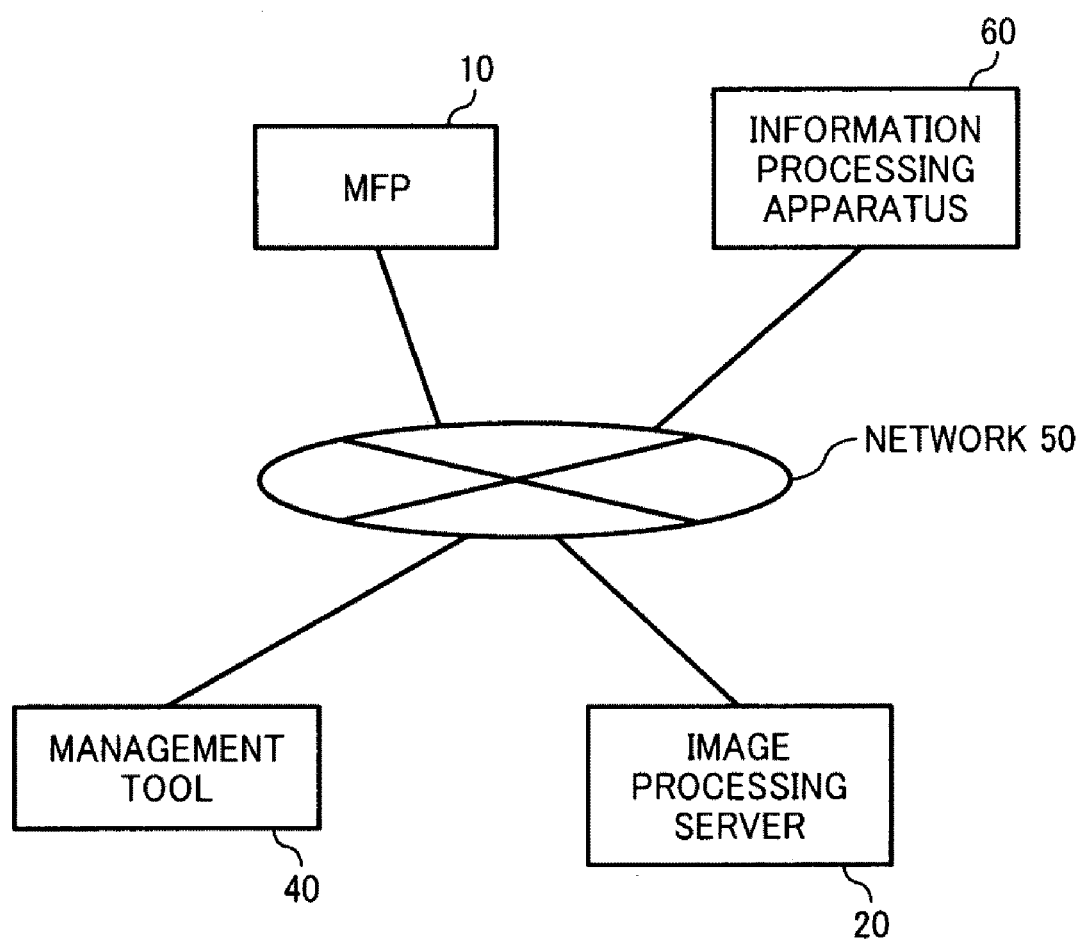
FIG. 1 is a configuration of an image processing system including an image processing server, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring to FIG. 1, an image processing system is explained according to an example embodiment of the present invention. The image processing system of FIG. 1 includes a multifunctional apparatus (MFP) 10, an image processing server 20, a management tool 40, and an information processing apparatus 60, which are connected through a network 50.

The MFP 10 may be implemented by any type of image forming apparatus capable of performing a plurality of image forming functions. In this example, the MFP 10 is provided with a scanner, which scans an original document into image data, and sends the image data to the image processing server 20. Further, in this example, the MFP 10 reads the original document having a barcode attached, and sends the image data having the barcode to the image processing server 20.

The image processing server 20 may be implemented by a computer having a central processing unit (CPU) and a memory. The image processing server 20 is provided with the barcode detection function of detecting and analyzing the barcode in the image data ("input image data") received from the MFP 10 to generate a barcode detection result, and the image processing function of applying image processing to the input image data when the barcode detection result indicates a detection error to generate the processed image data. Using the processed image data, the image processing server 20 repeats the barcode detection analysis to obtain a successful detection result.

Once the barcode is successfully detected, the image processing server 20 may further process the processed image data or unprocessed image data according to information obtained from the barcode. For example, the image processing server 20 may be additionally provided with the data transfer function of sending the processed or unprocessed image data to the information processing apparatus 60 through the network 50. The image processing server 20 may send the image data to the information processing apparatus 60, for example, by email, facsimile, or file transfer according to information obtained from the detected barcode. Further, the image processing server 20 may send the image data to any document server on the network 50 to store the image data in a folder that is accessible by the information processing apparatus 60 according to the information obtained from the detected barcode.

In this example, the MFP 10 and the image processing server 20 are separately provided. Alternatively, the MFP 10 and the image processing server 20 may be incorporated into one apparatus to provide a MFP having the scanning function, the barcode detection function, the image processing function, and the data transfer function.

The management tool 40 provides a user interface, which allows a user to input various information. For example, the user may set various settings such as image processing settings indicating a type of image processing or a pattern of retry operation to be applied by the image processing server 20 to the image data or data transfer settings indicating a specific location to which the image data is distributed by the image processing server 20. In another example, the user may provide information to be used for barcode detection such as information regarding the barcode to be detected.

The management tool 40 may be implemented by, for example, a computer terminal, a personal digital assistant (PDA) device, a portable phone, a digital camera, etc. Alternatively, the management tool 40 may be incorporated into the image processing server 20, for example, as an input device such as a mouse or a keyboard and a display device such as a liquid crystal display (LCD). Alternatively, the management tool 40 may be implemented by an operation panel that may be provided on the MFP 10. For example, the image processing server 20 and the MFP 10 may be incorporated into one apparatus such as the MFP capable of performing the scanning function, the barcode detection function, the image processing function and the data transfer function. In such case, a user interface provided on the MFP such as an operation panel may provide the function of the management tool 40.

As described above, when the barcode is not detected in the input image data, the image processing server 20 applies image processing to generate the processed image data, and tries to detect the barcode using the processed image data until a successful barcode detection result is obtained. The barcode detection error may occur for various reasons.

In one example, the barcode detection error may be caused due to the characteristics of the original document itself. The original document provided to the scanner of the MFP 10 may not be clean or may be folded. The barcode printed on the original document may have a thickened black bar due to the printer characteristics such as toner intensity or ink blur, changing the black/white ratio of the barcode. The barcode in the image data may have noise or may be distorted due to the deterioration of the printer which outputs the original document having the barcode.

In another example, the barcode detection error may be caused due to the characteristics of the scanner that reads the original document into the image data. The barcode in the image data may have a thickened or thinned black bar, which may be caused by the variation in intensity attributable to the mechanical or optical characteristics of the scanner. The barcode in the image data may have a thickened black bar or noise when the original document is scanned with the high intensity. The barcode in the image data may have noise or may be distorted due to the deterioration of the scanner.

In another example, the barcode detection error may be caused due to the characteristics of a barcode detection engine of the image processing server 20, which is software providing the barcode detection function. The barcode standard recommends the use of monochrome image for the barcode. In contrary, the barcode detection engine may request the MFP 10 to provide the halftone or grayscale image data. As the original document is read into halftone or grayscale image data, the edge of the barcode may blur such that the resultant image data may have a noise section around the barcode. Further, for most cases, the barcode detection engine of the image processing server 20 is not able to request the MFP 10 to read again the original document in case a barcode detection error occurs, as compared to the case of using a barcode reader manually operated by the human. In another example, the barcode detection engine may not be good at processing a certain type of image data.

Figure 3A:
FIG. 3A is an illustration for explaining a barcode detected in the example image data input to the image processing server of FIG. 1.
Figure 3B:
FIG. 3B is an enlarged section of the barcode illustrated in FIG. 3A when the barcode has noise.
Figure 3C:
FIG. 3C is an enlarged section of the barcode illustrated in FIG. 3A when the barcode has noise and is distorted.
Figure 3D:
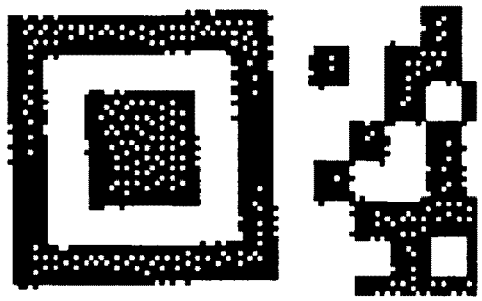
FIG. 3D is an enlarged section of the barcode illustrated in FIG. 3A when the barcode has a white dot spot.

FIG. 3A illustrates a portion of the two-dimensional (2D) code as an example of the barcode that is read by the MFP 10 and input to the image processing server 20. In one example, as illustrated in FIG. 3B, the read barcode may have a noise section in a barcode cell, such as a line, that is accidentally introduced when the original document is read by the scanner of the MFP 10. Additionally or alternatively, as illustrated in FIG. 3C, the read barcode may have a distorted barcode cell, for example, due to the deterioration of the scanner of the MFP 10. Additionally or alternatively, as illustrated in FIG. 3D, the read barcode may have a white dot spot in a barcode cell, for example, due to the characteristics of the scanner of the MFP 10.

Figure 4A:
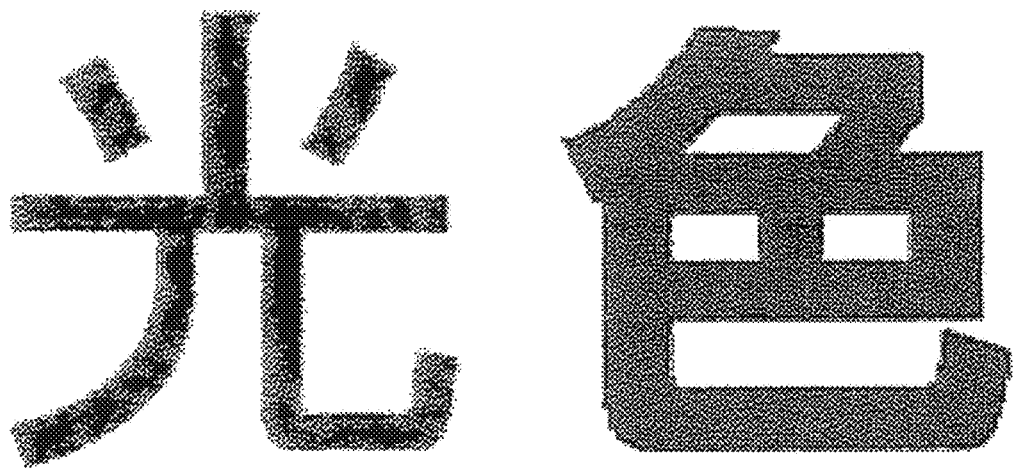
FIG. 4A is an illustration for explaining a character detected in the example image data input to the image processing server of FIG. 1 when the character has a white dot spot.
Figure 4B:
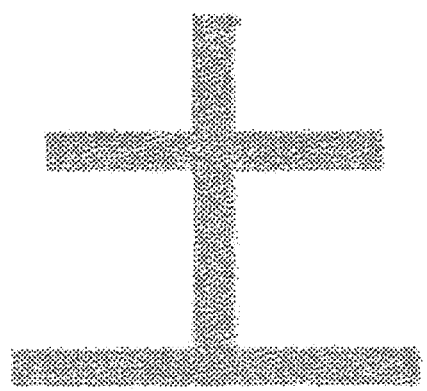
FIG. 4B is an illustration for explaining a character detected in the example image data input to the image processing server of FIG. 1 when the character has a white dot spot.
Figure 5:
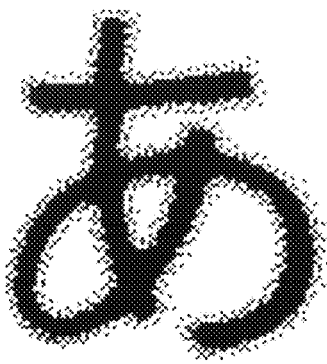
FIG. 5 is an illustration for explaining a character detected in the example image data input to the image processing server of FIG. 1 when the character has noise around the character.

For the illustrative purpose, the input image data may suffer from the low image quality as illustrated in any one of FIGS. 4A, 4B, and 5. As illustrated in FIGS. 4A and 4B, the input image data may have a character having a white dot spot, for example, due to the varied intensity attributable to the scanner characteristics. In such case, it is most likely that the barcode has a white dot spot as well, for example, as illustrated in FIG. 3D. As illustrated in FIG. 5, the input image data may have a character having noise surrounding the character, for example, due to grayscale processing applied by the MFP 10 to provide the grayscale image data as requested by the image processing server 20. In such case, it is most likely that the barcode has noise surrounding the black bar as well, for example, as illustrated in FIG. 3B.

When the input image data is not in good quality as described above referring to any one of FIGS. 3B, 3C, 3D, 4A, 4B, and 5, the barcode may not be accurately detected by the image processing server 20, thus causing a detection error. When the detection error occurs, the image processing server 20 applies image processing to the input image data and tries to detect the barcode using the processed image data to obtain a successful barcode detection result.

The examples of image processing applied by the image processing server 20 include, but not limited to: image rotation including rotating the image data by a predetermined degree based on a predetermined unit angle, such as by 90 degrees, 180 degrees, or 270 degrees; noise removal including removing a black or white dot, for example, having a X and Y dot sizes previously specified or automatically specified; monochrome smoothing including smoothing for copy capture image and smoothing for white dot filling; grayscale processing including applying grayscale processing to the binarized or color device-independent-bitmap (DIB) image to generate a grayscale DIB image; normalization, smoothing, and sharpening processing including rectangle space filtering processing by mask and soft/sharp conversion; image size magnification and reduction; grayscale reduction zooming including grayscale conversion of binarized DIB image; and color conversion including brightness conversion, contrast conversion, gamma conversion, and color tone conversion.

For the descriptive purpose, some types of image processing listed above are explained.

<Monochrome Smoothing>

The monochrome smoothing may be performed as follows. The image processor 26 applies smoothing using the 3×3 average value filter, and corrects the image intensity based on the bright value to generate the processed image data. More specifically, the intensity value of the processed image data may be specified using the bright value ranging from 0 to 10. In this example, with the increased bright value, the intensity value increases. For example, for the 3×3 window created around the target pixel of the input image data, if the value of the white pixel present in the window is less than the bright value previously set, the white pixel is determined to be the black pixel in the processed image data. When the value of white pixel present in the window is equal to or greater than the bright value, the white pixel is determined to be the white pixel in the processed image data. In this manner, the bright value may be changed to generate the processed image data with different intensities. If the intensity increases, the line in the image data is thickened. If the intensity decreases, the line in the image data is thinned.

When the bright value ranges from 1 to 9, the pixels located at the boundary of the input image data is assigned with the pixel value obtained from the input image data. When the bright value is set to 0, all pixels including the pixels located at the boundary of the input image data is assigned with the white pixel value. When the bright value is set to 10, all pixels including the pixels located at the boundary of the input image data is assigned with the black pixel value. This monochrome smoothing effectively corrects the image data having a white dot as illustrated in FIGS. 4A and 4B or the image data having the noise as illustrated in FIG. 5.

As monochrome processing, the white dot filling processing may be applied to fill in an isolated white pixel surrounded by a continuous black pixel run. This white dot filling processing effectively corrects the image data having a white dot as illustrated in FIGS. 4A and 4B.

<Grayscale Reduction>

For example, when the image data size is to be reduced by half, the image data can be converted to the grayscale image data having a tone ranging from 0 to $2^n$ based on the number of black pixels included in an area defined by n pixels by n pixels, with the n being an arbitrary integer. For example, in the case of the 2 pixel by 2 pixel area, the image data can be converted to the image data having 5 tones ranging from 0 to 4 based on the number of black pixels present in the 2 pixel by 2 pixel area. In the case of the 4 pixel by 4 pixel area, the image data can be converted to the image data having 17 tones ranging from 0 to 16. The area used for counting the number of black pixels therein may be fixed or changed according to the reduction scale. The grayscale reduction processing is applicable to the characteristics of the barcode detection engine of image processing server 20 having the capability of processing the grayscale data. The grayscale reduction processing may be preferably applied to meet the requirement of the barcode detection engine of the image processing server 20, while still being in compliance with the barcode standard. The MFP 10 may read the original document into monochrome image data without applying halftone processing. The image processing server 20 may apply grayscale reduction processing to meet the requirement of the barcode detection engine. Further, since the grayscale image data usually has the larger image size, the image data size is suppressed.

<Improving Image Quality of Reduced Size Image>

The pixel value of the target pixel included in the reduced size image is determined based on the average pixel value obtained from the portion of the original image that corresponds to the target pixel of the reduced size image, for example, using the area-average method. In the case of processing the 1-bit image data, the average value obtained as the middle value of the 0 to 255 range is binarized based on a threshold value.

Figure 2:
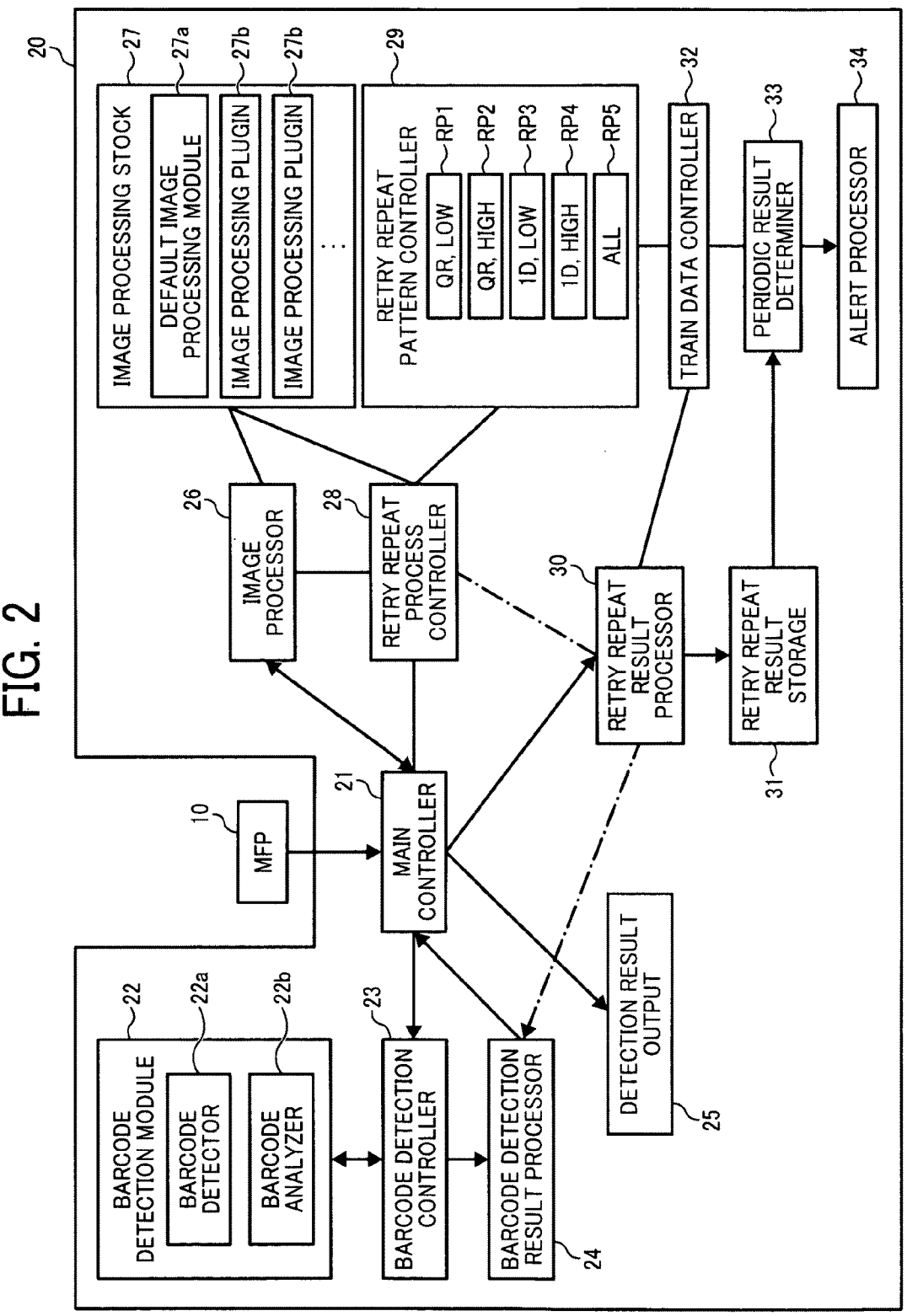
FIG. 2 is a schematic block diagram illustrating a functional structure of the image processing server of FIG. 1.

Referring to FIG. 2, a functional structure of the image processing server 20 is explained according to an example embodiment of the present invention. The image processing server 20 includes a main controller 21, a barcode detection module 22, a barcode detection controller 23, a barcode detection result processor 24, a detection result output 25, an image processor 26, an image processing stock 27, a retry repeat process controller 28, a retry repeat pattern controller 29, a retry repeat result processor 30, a retry repeat result storage 31, a train data controller 32, a periodic result determiner 33, and an alert processor 34.

Any one of the above-described functional blocks of the image processing server 20 may be implemented by the CPU and the memory of the image processing server 20 according to an image processing control program. For example, the CPU loads the image processing control program onto its memory functioning as a work area of the CPU to cause the image processing server 20 to have the functional blocks as illustrated in FIG. 2. The image processing stock 27 and the retry repeat result storage 31 may each be implemented by the memory accessible by the CPU of the image processing server 20 including, for example, a non-volatile random access memory (NVRAM), a hard disk drive (HDD), or a recording medium readable by the image processing server 20.

The main controller 21 controls entire operation of the image processing server 20. In this example, the main controller 21 causes the image processing server 20 to detect a barcode in the image data received from the MFP 10, while applying image processing to the image data to improve the barcode detection probability. For the descriptive purpose, in this specification, any type of code embedded with specific information is collectively referred to as the barcode such that the barcode in this example includes the one-dimensional (1D) code as well as the two-dimensional (2D) code.

The barcode detection module 22 includes a barcode detector 22a and a barcode analyzer 22b, and provides the function of detecting and analyzing a barcode in the input image data input to the image processing server 20 to generate a barcode detection result. The barcode detector 22a detects the barcode location such as the coordinate of a portion of the image data having the barcode therein, and/or the angle of the barcode with respect to a reference orientation of the input image data. The barcode detector 22b further determines a type of the barcode included in the input image data, for example, to assume whether the barcode is one-dimensional (1D) or two-dimensional (2D). Based on information obtained by the barcode detector 22a, the barcode analyzer 22b analyzes the barcode to generate a barcode detection result indicating the type of the barcode as well as information embedded in the barcode. The barcode detection controller 23 controls the barcode detection module 22 to control operation of barcode detection and analysis, and causes the barcode detection result to be output to the barcode detection result processor 24.

The barcode detection result processor 24 applies various processing such as merging or coordinate conversion on the barcode detection result. For example, when more than one barcode detection result is obtained, the barcode detection result processor 24 may merge a plurality of barcode detection results into one barcode detection result. For example, when the results of the barcode detection are different, the barcode detection result processor 24 may select the barcode detection result for output by majority rule.

Further, the barcode detection result processor 24 may apply coordinate conversion to the input image data, for example, when the barcode detection result indicates that the barcode is successfully detected from the image data that is rotated by a predetermined degree. More specifically, in such case, information regarding the barcode location is updated to reflect the correct orientation of the input image data. For example, when the barcode is successfully detected from the image data rotated by 90 degrees in the clockwise direction, the barcode location information is output after rotating the coordinate by 90 degrees in the counterclockwise direction. In this way, the barcode location information is made in consistent with the processed image data.

When the barcode detection result indicates a detection error, the main controller 21 causes the image processor 26 to apply image processing to the input image data to generate processed image data, and further causes the barcode detection module 22 to detect and analyze the barcode in the processed image data such that the barcode detection result is successfully obtained from the processed image data. More specifically, the main controller 21 repeatedly performs image processing and barcode detection analysis until the barcode detection result indicating the barcode type is successfully obtained. In this example, one set of image processing operation and barcode detection analysis operation to be performed when the detection error occurs is referred to as a retry operation. The main controller 21 may cause the retry operation to be performed for a predetermined number of times, while causing the image processor 26 to apply a different type of image processing for each retry operation.

The image processing stock 27 stores one or more image processing modules to be used by the image processor 26 to perform one or more types of image processing. As illustrated in FIG. 2, the image processing stock 27 is previously provided with a default image processing module 27a, which is capable of performing one or more types of image processing previously set by default. In addition to the default image processing module 27a, the user may register any number of image processing module plugin 27b to be added to the image processing stock 27. Since any type of image processing module may be added as plugin, the user may easily add or modify the types of image processing to be applied by the image processor 26.

The retry repeat process controller 28 controls how the retry operation of image processing and barcode detection analysis should be performed when the barcode detection error occurs. More specifically, the retry repeat process controller 28 controls the types of image processing to be performed by the image processor 26 according to image processing type information indicating one or more types of image processing that may be selected based on information obtainable from the image processing stock 27. The retry repeat process controller 28 controls the order of processing one or more types of image processing according to processing order information indicating the order of applying the plurality of types of image processing as the retry operations are sequentially performed. The retry repeat process controller 28 controls a number of times the image processing server 20 performs the retry operation according to retry number information indicating a number of successful detection results required to end the retry operation.

As illustrated in FIG. 2, the retry repeat pattern controller 29 stores the image processing type information, the processing order information, and the retry number information, in the form of a retry pattern (RP). The RP specifies the N combinations of the retry operation to be performed by the image processor 26 and the barcode detection module 22. The RP further specifies the processing order indicating in what order the N combinations of the retry operation should be performed, and the retry number information indicating when the retry operation should end.

In the example illustrated in FIG. 2, the RP stored in the retry repeat pattern controller 29 includes a RP1, RP2, RP3, RP4, and RP5. In this example, the "LOW" value or "HIGH" value of the RP indicates the detection accuracy level with respect to the processing time for the retry operation, which may vary depending on the retry number information and the processing time information. The "LOW" value indicates that the number of retry operations to be performed is relatively less, while the types of image processing to be performed are selected such that the overall processing time is relatively less. The "HIGH" value indicates that the number of retry operations to be performed is relatively large, while the types of image processing to be performed are selected such that the overall processing time is relatively long. Further, in this example, the "QR" value or "1D" value of the RP indicates the type of the barcode subjected for processing, or the types of image processing to be performed which is determined based on the barcode type. The "QR" value indicates that the types of image processing to be performed are selected so as to process the QR code. The "1D" value indicates that the types of image processing to be performed are selected so as to process the 1D code. The "ALL" value indicates that all types of image processing available for use by the image processing server 20 are performed for the retry operation. Any one of the above-described values of the RP may be set by the image processing server 20 automatically or according to a user instruction received through the management tool 40.

More specifically, with the RP1 "QR, LOW", the retry repeat process controller 28 causes the image processing server 20 to perform a combination of image processing previously selected to process the QR code with the relatively less processing time, while reducing the number of retry operations. With the PR 2 "QR, HIGH", the retry repeat process controller 28 causes the image processing server 20 to perform a combination of image processing previously selected to process the QR code with the relatively more processing time, while increasing the number of retry operations. With the RP 3 "1D, LOW", the retry repeat process controller 28 causes the image processing server 20 to perform a combination of image processing selected to process the 1D code with the relatively less processing time, while reducing the number of retry operations. With the RP 4 "1D, HIGH", the retry repeat process controller 28 causes the image processing server 20 to perform a combination of image processing selected to process the 1D code with the relatively more processing time, while increasing the number of retry operations. With the RP 5, the retry repeat process controller 28 causes the image processing server 20 to perform a combination of all types of image processing available for use by the image processing server 20. One or more barcode detection results obtained by sequentially applying the retry operations may be output to the retry repeat result processor 30, and further to the barcode detection result processor 24. The barcode detection result processor 24 may merge the barcode detection results as described above to generate a barcode detection result including, for example, information regarding the type of the barcode. Under control of the main controller 21, the barcode detection result is sent to the barcode detection result output 25.

The barcode detection result output 25 outputs the barcode detection result to the information processing apparatus 60 through the network 50. With the barcode detection result indicating information embedded in the barcode, the barcode detection result output 25 may output information regarding the barcode location and the barcode type as well as the image data. In this example, the image data may be the unprocessed image data or the processed image data, which may be selectable by the user. Further, based on the barcode detection result, the barcode detection result output 25 may send an instruction regarding various bibliographic data such as a storage file to store the image data or a file name to be assigned to the storage file. Further, when the original document includes a plurality of pages, the barcode detection result output 25 may divide a set of image data into two sets of image data based on a sheet having the barcode printed thereon using the information regarding the barcode location.

The retry repeat result processor 30 collects one or more barcode detection results generated for each retry operation, which is obtained by the barcode detection module 22 using the processed image data output by the image processor 26. The collected barcode detection results are stored in the retry repeat result storage 31 as the retry operation results. Additionally, the retry repeat result processor 30 may store various information regarding the retry operation including, for example, information regarding the processing time required to complete the retry operation, information regarding the barcode detection error, etc., as the retry operation results. In order to obtain information regarding the retry operation, the retry repeat result processor 30 may be provided with a counter for counting the number of retry operations sequentially performed to obtain a successful detection result, a detector for obtaining the processing time required for performing the retry operation, etc.

The retry operation results stored in the retry repeat result storage 31 may be used in various ways. For example, the retry repeat result processor 30 may collect information regarding the barcode detection error for a predetermined time period, and output the collected result for display to the user. Based on the collected result, the user such as an administrator of the image processing system may maintain the image processing system.

The periodic result determiner 33 determines whether notification to the user is recommended based on the retry operation results stored in the retry repeat result storage 31. When it is determined that notification is recommended, the periodic result determiner 33 causes the alert processor 34 to send an alert to the user.

In one example, the periodic result determiner 33 may obtain information regarding the number of retry operations sequentially preformed to obtain a successful detection result, which is obtained by the retry repeat result processor 30 for a predetermined time period. When the average number of retry operations for the predetermined time period exceeds a threshold value, the periodic result determiner 33 causes the alert processor 34 to send an alert to the user.

In another example, the periodic result determiner 33 may obtain information regarding the processing time for completing the retry operations to obtain a successful detection result, which is obtained by the retry repeat result processor 30 for a predetermined time period. When the average processing time of retry operations per page of the image data for the predetermined time period exceeds a threshold value, the periodic result determiner 33 causes the alert processor 34 to send an alert to the user.

In another example, the periodic result determiner 33 may obtain information regarding the number of successful detection results having the same result obtained for the barcode having the same barcode location information ("the same detection results"), which is obtained by the retry repeat result processor 30 for a predetermined time period. When the average number of the same detection results for the predetermined time period is less than a threshold value, the periodic result determiner 33 causes the alert processor 34 to send an alert to the user.

In another example, the periodic result determiner 33 may request the user to perform calibration operation. In calibration operation, the image processing server 20 performs all types of image processing using sample image data. Based on the detection results, the periodic result determiner 33 generates a calibration report. The calibration report may be stored in a memory of the image processing server 20 or output for display to the user. Based on the detection results, the periodic result determiner 33 may cause the periodic result determiner 33 to send an alert to the user.

The periodic result determiner 33 sends an alert to the user, for example, by sending an email message to the information processing apparatus 60 or displaying an alert message through the information processing apparatus 60 or the management tool 30.

The train data controller 32 determines a retry pattern that is most efficient in terms of processing time and detection accuracy, based on the retry operation result stored in the retry repeat result storage 31. The train data controller 32 uses the most efficient retry pattern as train data to cause the image processing server 20 to learn based on the train data. More specifically, when the most efficient retry pattern is determined, the train data controller 32 updates the retry repeat pattern controller 29 with the most efficient retry pattern.

In one example, the train data controller 32 obtains information regarding one or more types of image processing not contributing to the successful detection results, for example, based on information regarding the barcode detection error rate collected for a predetermined time period. The train data controller 32 updates the retry repeat pattern controller 29 such that one or more types of image processing not contributing to the successful detection results are not performed.

In another example, the train data controller 32 obtains information regarding the input image data causing a barcode detection error. For example, the input image data causing a detection error may be stored with the processed image data obtained after performing the image processing. The stored image data may be used as sample image data for calibration operation.

In this example, while various types of image processing may be applied to improve the barcode detection probability, the image processing stock 27 is able to store a limited number of image processing modules due to the memory space requirement. Further, it is not practical to try to apply a wide variety of image processing in terms of the processing time. For this reason, it is preferable to previously determine a limited number of types of image processing for use by the image processing server 20, for example, using a method of selection described below. This selection process is performed by the image processing server 20, for example, under control of the train data controller 32 either periodically or upon a request received from the user.

Figure 6:
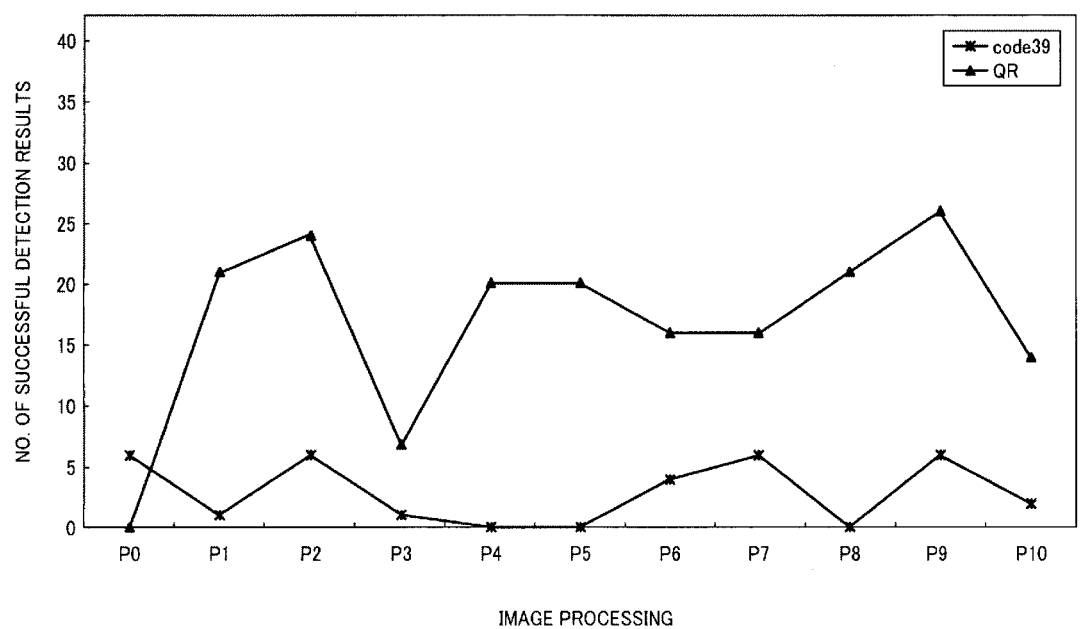
FIG. 6 is a graph illustrating the number of successful barcode detection results obtained after applying a different type of image processing to the image data.

FIG. 6 illustrates the probability in which the barcode is successfully detected after performing a different type of image processing to the input image data. In this example, the image processing server 20 performs the retry operation once when the barcode detection result indicates a detection error. The X axis of the graph indicates a specific type of image processing applied to the image data. The Y axis of the graph indicates the number of the successful detection results obtained from the processed image data. In this example, the total number of samples, or the image data, is 42. The image data being processed includes noise, such as a line. Further, the barcode embedded into the image data is the code 39 or the QR code.

Specifically, in this example, the image processing "original image" with the identification number P0 indicates that no image processing is applied. The image processing "90 degree rotation" with the identification number P1 refers to rotating the input image data by 90 degrees. The image processing "180 degree rotation" with the identification number P2 refers to rotating the input image data by 180 degrees. The image processing "270 degree rotation" with the identification number P3 refers to rotating the input image data by 270 degrees. The image processing "grayscale smoothing" with the identification number P4 refers to applying grayscale processing and smoothing to the input image data. The image processing "grayscale zoom 70%" with the identification number P5 refers to applying grayscale reduction with the reduction scale of 70%. The image processing "grayscale weighted average" with the identification number P6 refers to applying grayscale processing and smoothing to the input image data using the weighted average. The image processing "noise removal, smoothing" with the identification number P7 refers to applying noise removal and monochrome smoothing to the input image data. The image processing "noise removal, smoothing, 90 degree rotation" with the identification number P8 refers to applying noise removal, monochrome smoothing, and 90 degree image rotation. The image processing "noise removal, smoothing, 180 degree rotation" with the identification number P9 refers to applying noise removal, monochrome smoothing, and 180 degree image rotation. The image processing "noise removal, smoothing, 270 degree rotation" with the identification number P10 refers to applying noise removal, monochrome smoothing, and 270 degree image rotation.

Referring to FIG. 6, the barcode detection probability, or the number of successful detection results, tends to increase after applying a specific type of image processing to the input image data. However, for some types of image processing such as the image processing P4, P5, and P8, the barcode detection probability remains "0" indicating that no successful detection result is obtained. Further, even with the increase in barcode detection probability, the barcode is still not detected for about half of the samples of the input image data in the case of QR code.

Figure 7:
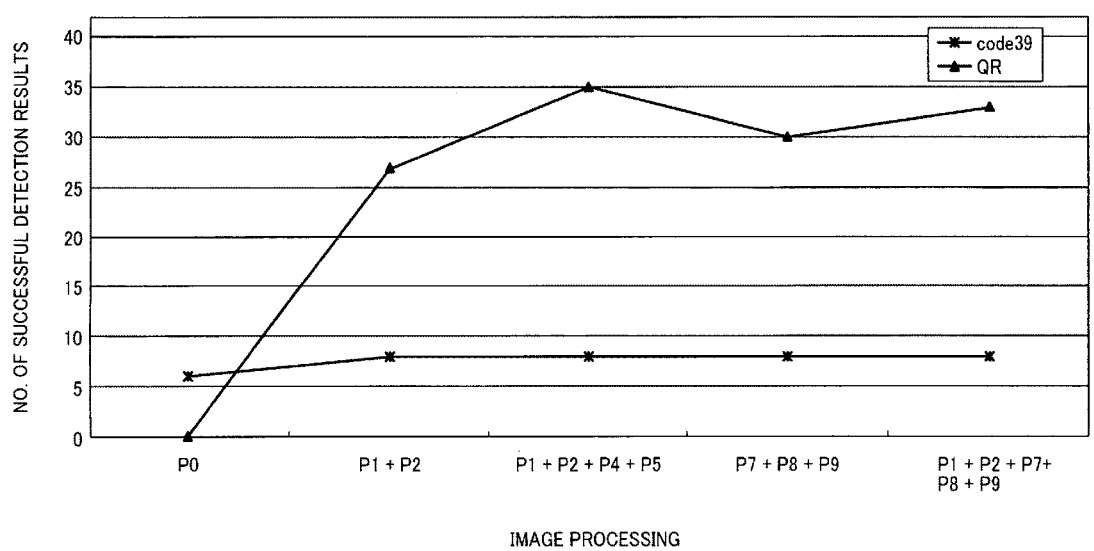
FIG. 7 is a graph illustrating the number of successful barcode detection results obtained after sequentially applying different types of image processing to the image data.

FIG. 7 illustrates the probability in which the barcode is successfully detected after performing a plurality of different types of image processing to the input image data. In this example, the image processing server 20 performs the retry operation more than once when the barcode detection result indicates a detection error. The X axis of the graph indicates a combination of the types of image processing applied to the input image data for more than one retry operation. The Y axis of the graph indicates the number of the successful detection results obtained from the processed image data. In this example, the total number of samples, or the input image data, is 42. The image data being processed includes noise, such as a line. Further, the barcode embedded into the image data is the code 39 or the QR code.

Specifically, in this example, the image processing "P1+P2" indicates that the image processing P1 and the image processing P2 of FIG. 6 are sequentially applied. The image processing "P1+P2+P4+P5" indicates that the image processing P1, P2, P4, and P5 of FIG. 6 are sequentially applied. The image processing "P7+P8+P9" indicates that the image processing P7, P8, and P9 of FIG. 6 are sequentially applied. The image processing "P1+P2+P7+P8+P9" indicates that the image processing P1, P2, P7, P8, and P9 of FIG. 6 are sequentially applied. In comparison with the case illustrated in FIG. 6, sequentially performing more than one type of image processing on the input image data improves the barcode detection probability.

In the example of FIGS. 6 and 7, the types of image processing applied to the input image data is specially designed for the QR code. For this reason, the QR code has the barcode detection probability much higher than the barcode detection probability of the code 39. In order to improve the barcode detection probability for the code 39, the image processing designed for the code 39 may need to be selected and used in replace of the image processing designed for the QR code. In other words, the type of image processing to be applied may need to be selected based on the type of the barcode subjected for detection. For example, assuming that the barcode detection module 22 of the image processing server 20 is capable of analyzing the grayscale image data with the automatic contrast correction capability, the types of image processing to be applied may be made different depending on the type of the barcode determined based on whether the automatic contrast correction capability improves the barcode detection probability. For the barcode type that can be efficiently detected using the automatic contrast correction capability, such as the QR code or DataMatrix code, the types of image processing resulting in smoothened image may be selected. For the other type of barcodes such as the Code39, Code128, Codabar, PDF417, Int2of5, EAN-8, etc., the types of image processing resulting in sharpened image may be selected.

Referring now to FIGS. 8 to 12, example operation of selecting a combination of the types of image processing to be performed by the image processing server 20, performed by the train data controller 32, is explained.

FIG. 8 illustrates the barcode detection result obtained for each sample of the input image data, after performing a specific type of image processing to the input image data. The column "IMAGE NO" specifies an identification number uniquely assigned to the sample input image data. The column "FILE NAME" indicates the file name of the sample input image data. The columns P0 to P12 each indicate the specific type of image processing applied by the image processor 26 to the input image data. In this example, in addition to the image processing P0 to P10 described above referring to FIG. 6, the image processing "grayscale high image quality enlarge 200%" with the identification number P11 and the image processing "mono 300%" with the identification number P12 are additionally applied. The image processing P11 refers to applying grayscale processing, image quality improvement processing, and enlarging with the enlarged scale ratio of 200%. The image processing P12 refers to applying enlarging with the enlarged scale ratio of 300% to generate enlarged size monochrome image. The column "HITS" indicates the number of successful detection results obtained for each input image data.

When the barcode detection result indicates that the barcode is successfully detected for the specific input image data after applying the specific type of image processing, the value "1" is entered in the cell. When the barcode detection result indicates that the barcode detection error occurs for the specific input image data after applying the specific type of image processing, no value is entered in the cell or the value "0" may be entered in the cell.

In this example, for each sample input image data, the barcode detection module 22 performs the operation of barcode detection and analysis using 12 different types of processed image data respectively generated by applying the different types of image processing. The column "HITS" indicates the total number of successful detection results obtained for each sample input image data, which is the sum of the values "1" obtained for each processed image data. The higher value in the number of successful detection results indicates that the barcode in the input image data can be detected using a wide variety of image processing. The lower value in the number of successful detection results indicates that the barcode in the input image data can be detected using a limited type of specific image processing. If the value "0" is obtained as the number of successful detection results, the barcode in the input image data is not detected using any one of the image processing types listed in FIG. 8. In such case, the other type of image processing should be applied to detect the barcode.

Referring to FIG. 8, the barcode detection result differs depending on the type of image processing applied to the input image data even when the image data for processing is the same. This indicates that applying the different types of image processing may effectively compensate the weakness of each other, thus improving the overall barcode detection probability.

The inventor of the present invention applied the different types of image processing to 99 sample image data. The sample image data is the image data embedded with a barcode, which is not successfully detected for various reasons as described above referring to FIG. 3A to FIG. 5. By applying the different types of image processing, the barcode was successfully detected for the 96 sample image data such that the barcode detection error is greatly reduced from 99/99 to 3/99. This barcode detection error was further reduced to 0/99 when the types of image processing match the type of the barcode subjected for detection.

Figure 9:
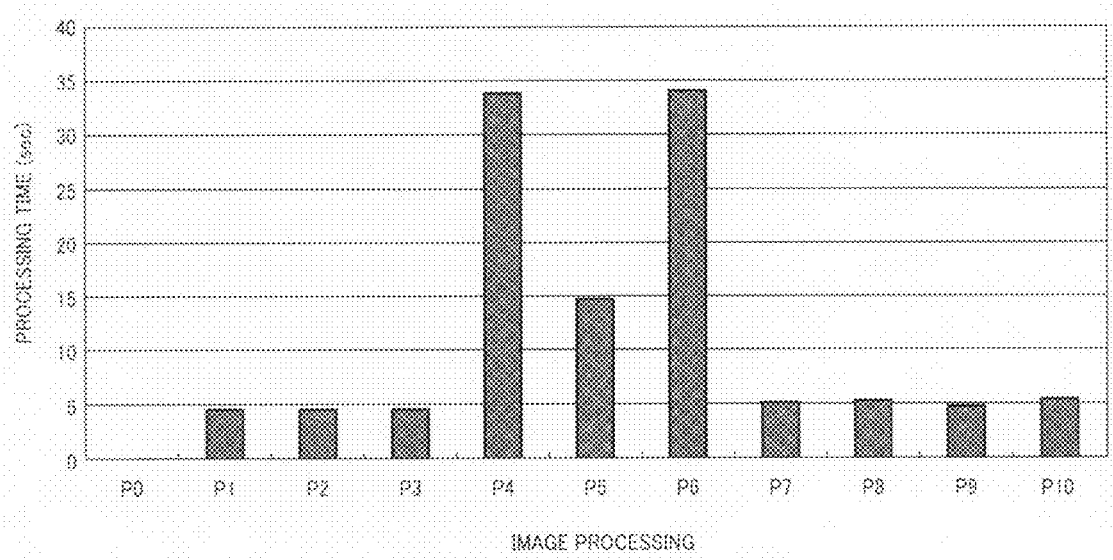
FIG. 9 is a table illustrating the processing time required for applying a different type of image processing to the image data.

FIG. 9 illustrates the processing time required for the image processor 26 of the image processing server 20 to perform the specific type of image processing on the input image data. In this example, the input image data is scanned from a 42-page document. The X axis of the graph specifies the specific type of image processing applied to the input image data. For the descriptive purpose, the image processing types are the same as the image processing types described above referring to FIGS. 6 and 7. The Y axis of the graph specifies the processing time in seconds.

Referring to FIG. 9, for the image processing with the identification numbers P1, P2, P3, P7, P8, P9, and P10, the processing time is about 5 seconds such that the average processing speed of about 0.1 second per one page is required. In this example, the processing speed for the barcode detection module 22 to complete the operation of barcode detection and analysis is about 0.3 seconds for one page of the image data. Accordingly, the processing speed for the image processing server 20 to complete the retry operation is about 0.4 seconds for one page. Assuming that the retry operation is repeated for 5 times using the different types of image processing, the image processing server 20 requires about 2 seconds to obtain a desired number of successful detection results. Taking into account that the error occurrence rate in barcode detection is about 0.5 percent, it is assumed that performing the retry operation for about 2 seconds is practical.

On the other hand, for some types of image processing, the processing time is relatively long such that the average processing speed of about one second per one page is required. Accordingly, the processing speed for the image processing server 20 to complete the retry operation is more than one second for one page. When performing the image processing requiring the longer processing time, the number of performing the retry operations may need to be considered. For example, in case of performing all types of image processing available for use by the image processor 26, the image processing server 20 may request the user to select between a fast processing mode and a high quality mode. When the fast processing mode is selected, the image processing server 20 may reduce the number of retry operations or may select the types of image processing requiring less processing time to reduce the overall processing time. When the high quality mode is selected, the image processing server 20 may increase the number of retry operations or may select the types of image processing having the high successful detection results to increase the barcode detection probability. Referring back to FIG. 2, based on the selected mode, the retry repeat process controller 28 may select a RP having the LOW value or the HIGH value.

As described above referring to FIGS. 6 to 9, the barcode detection probability or the processing time depends on the specific RP selected for use by the image processing server 20. The combination of image processing to be performed by the image processor 26, which is stored as the image processing type information, may be previously determined, for example, as described below.

From the barcode detection result shown in FIG. 8, only the input image data having the value equal to or greater than the value "1" for the number of successful detection results ("HITS") is considered as indicated by the dark section of the table of FIG. 10. Referring to the cases of the input image data having the value "1" for the number of successful detection results, there are four different types of image processing each contributing to the successful detection result. These image processing types, specifically, the "180 degree rotation" with the identification number P2, the "grayscale zoom 70%" with the identification number P5, the "noise removal, smoothing, 180 degree rotation" with the identification number P9, and the "noise removal, smoothing, 270 degree rotation" with the identification number P10 are selected as the types of image processing to be applied by the image processor 26 for retry operation.

Next, from the barcode detection result shown in FIG. 10, only the input image data having the value equal to or greater than the value "2" for the number of successful detection results ("HITS") is considered as illustrated in FIG. 11. For each input image data having the value "2" as the number of successful detection results, it is determined whether there is any type of image processing that contributes to the successful detection results other than the types of image processing previously selected. This operation may be repeated, for example, by increasing the value of the number of successful detection results. By repeating this process, the table of FIG. 12 may be generated, which lists one or more types of image processing to be used by the image processor 26 in addition to the previously selected types of image processing.

Alternatively, using the barcode detection result shown in FIG. 11, any one of the input image data having the successful detection result that can be obtained using any one of the selected types of image processing may be removed from consideration, thus resulting in the table of FIG. 12 that lists one or more sample image data requiring the other types of image processing to have the successful detection results of at least two.

Referring to FIG. 12, either one of the "grayscale smoothing" image processing with the identification number P4 or the combination of the "grayscale high image quality 200%" with the identification number P11 and the "normal, smoothing, 90 degree rotation" image processing with the identification number P8 may be selected to be used by the image processor 26 for retry operation.

As described above referring to FIG. 10, the image processing type contributing to the successful detection result for the input image data having the low barcode detection probability is firstly selected for use, based on the premise that such image processing successfully detects the barcode for a wide variety of input image data. However, if such image processing type does not successfully detect the barcode for a large number of input image data, the other type of image processing may need to be considered for use.

Figure 13:
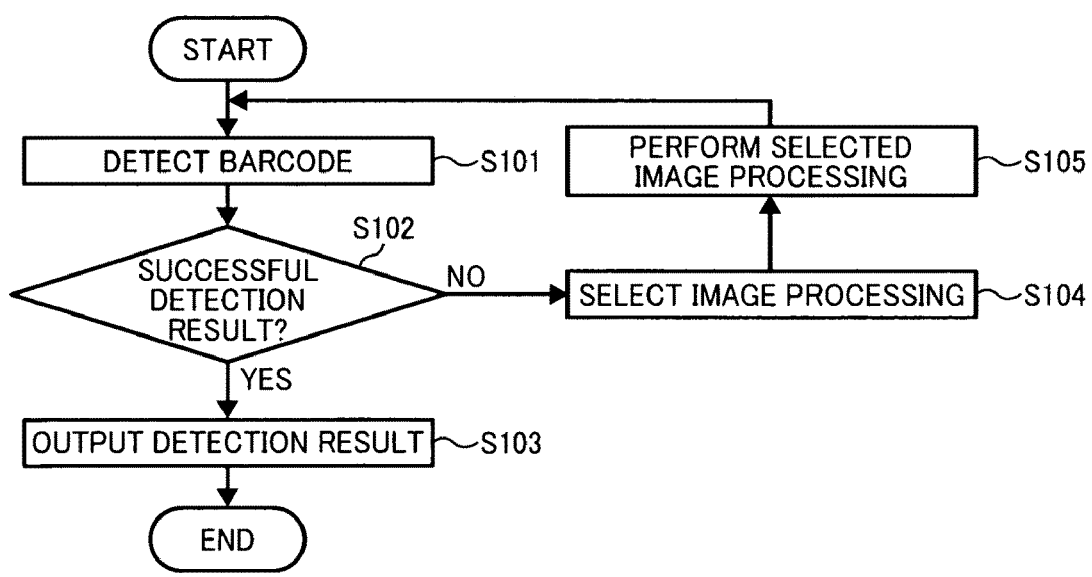
FIG. 13 is a flowchart illustrating operation of sequentially performing the retry operations of image processing and barcode detection while changing a type of image processing, performed by the image processing server of FIG. 1, according to an example embodiment of the present invention.

Referring to FIG. 13, operation of sequentially performing retry operations of image processing operation and barcode detection analysis operation is explained according to an example embodiment of the present invention. The operation of FIG. 13 may be performed by the image processing server 20 under control of the main controller 21.

At S101, the barcode detection module 22 detects and analyzes a barcode in the input image data to generate a barcode detection result. The barcode detection result is output to the main controller 21.

At S102, the main controller 21 determines whether the barcode detection result indicates that the barcode is successfully detected and analyzed. When it is determined that the barcode is successfully detected and analyzed ("YES" at S102), the operation proceeds to S103 to cause the detection result output 25 to output the barcode detection result and the operation ends. When it is determined that the barcode is not successfully detected or analyzed ("NO" at S102), the operation proceeds to S104.

At S104, the main controller 21 causes the retry repeat process controller 28 to select a specific type of image processing to be applied to the input image data based on the information stored in the retry repeat pattern controller 29.

At S105, under control of the retry repeat process controller 28, the image processor 26 applies the selected specific type of image processing to the input image data to generate the processed image data. The processed image data is output to the barcode detection module 22.

The image processing server 20 repeats S101 to generate a barcode detection result using the processed image data, and S102 to determine whether the barcode is successfully detected. This retry operation of S104, S105, S101, and S102 is repeatedly performed until the barcode detection result indicating that the barcode is successfully detected is obtained. When the successful barcode detection result is obtained and output, the operation ends.

While the image processing server 20 is able to output the barcode detection result using the retry operation of FIG. 13, applying various types of image processing may sometimes introduce an error in barcode detection. For example, in the example case illustrated in FIG. 8, after repeatedly applying various types of image processing, the code 39 barcode was interpreted as the code 25 (Int2to5) barcode in error. In light of the possible barcode detection error caused by image processing, the image processing server 20 may determine that the barcode is successfully detected when the same barcode detection result is obtained using at least two different types of processed image data each applied with different types of image processing.

In view of the above, the RP stored in the retry repeat pattern controller 29, which indicates the combinations of image processing to be performed by the image processor 26, may be previously determined so as to require at least two same barcode detection results, for example, as described below. More specifically, the train data controller 32 may perform operation of selecting a combination of the types of image processing as described below referring to FIGS. 14 to 15.

From the barcode detection result shown in FIG. 8, only the input image data having the value equal to or greater than the value "2" for the number of successful detection results ("HITS") is considered as indicated by the dark sections illustrated in the table of FIG. 14. Referring to the cases of the input image data having the value "2" for the number of successful detection results, there are eight different types of image processing each contributing to the successful detection results. These image processing types, specifically, the "90 degree rotation" image processing with the identification number P1, the "180 degree rotation" image processing with the identification number P2, the "270 degree rotation" image processing with the identification number P3, the "noise removal, smoothing, 90 degree rotation" image processing with the identification number P8, the "noise removal, smoothing, 180 degree rotation" image processing with the identification number P9, the "grayscale smoothing" image processing with the identification number P4, the "grayscale zoom 70%" image processing with the identification number P5, and the "grayscale high image quality 200%" image processing with the identification number P11, are selected as the types of image processing to be applied by the image processor 26 for retry operation.

Next, from the barcode detection result shown in FIG. 14, only the input image data having the value equal to or greater than the value "3" for the number of successful detection results ("HITS") is considered as illustrated in FIG. 15.

Since the successful barcode detection results can be obtained at least two times for all input image data included in the table of FIG. 15 using at least two different types of the selected image processing that is selected based on the table of FIG. 14, selecting the additional types of image processing is not needed.

Figures 16, 17:
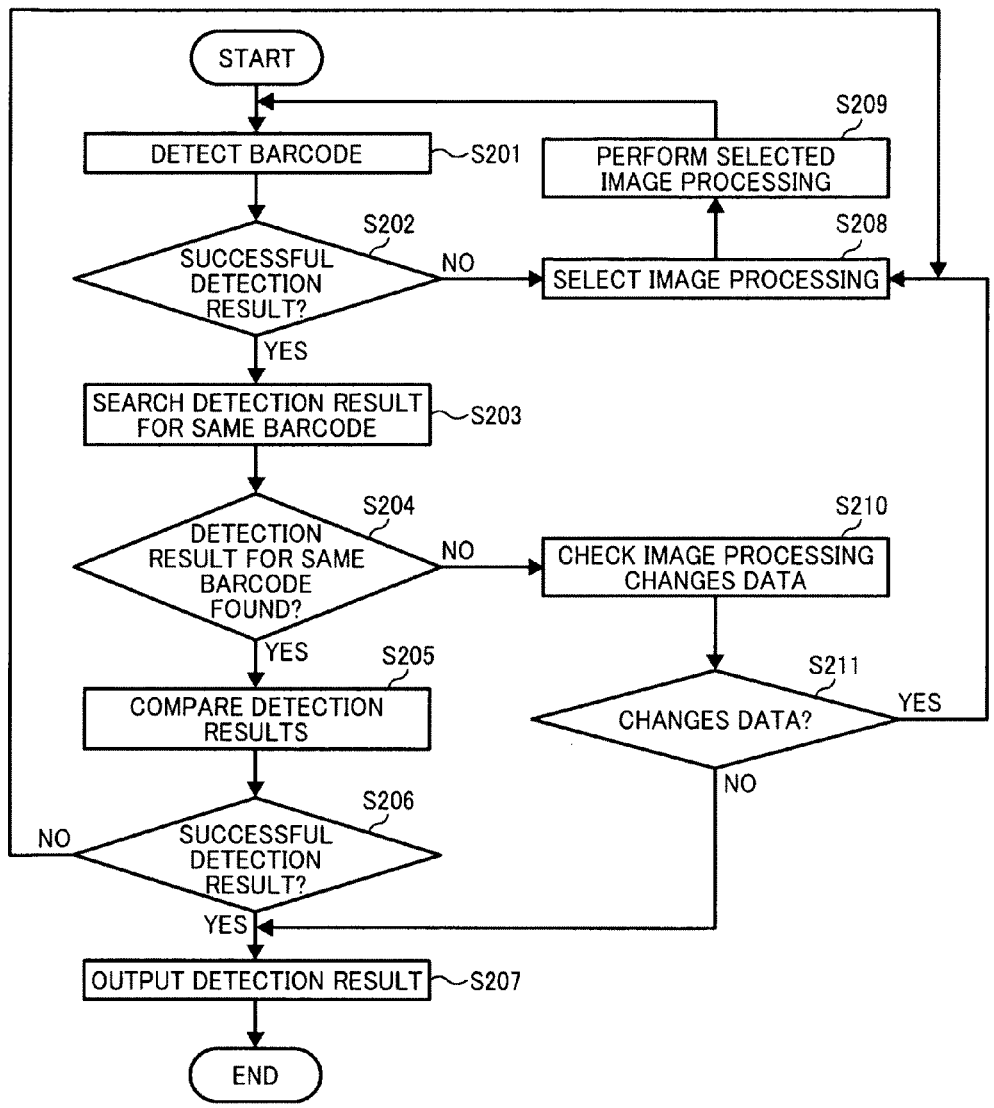
FIG. 16 is a flowchart illustrating operation of sequentially performing the retry operations of image processing and barcode detection while changing a type of image processing, performed by the image processing server of FIG. 1, according to an example embodiment of the present invention.
FIG. 17 is an illustration for explaining a barcode detection error rate based on the presence of a check digit function of the barcode being detected.

Referring to FIG. 16, operation of sequentially performing retry operations of image processing operation and barcode detection analysis operation is explained according to an example embodiment of the present invention. The operation of FIG. 16 may be performed by the image processing server 20 under control of the main controller 21. Further, in this example, the main controller 21 determines that the barcode detection is successful when the same barcode detection results are obtained for at least two different processed image data respectively generated by applying different types of image processing.

At S201, the barcode detection module 22 detects and analyzes a barcode in the input image data to generate a barcode detection result. The barcode detection result is output to the main controller 21.

At S202, the main controller 21 determines whether the barcode detection result indicates that the barcode is successfully detected and analyzed. When it is determined that the barcode is successfully detected and analyzed ("YES" at S202), the operation proceeds to S203. When it is determined that the barcode is not successful detected or analyzed ("NO" at S202), the operation proceeds to S208.

At S203, the main controller 21 causes the barcode detection controller 23 to search for a barcode detection result previously obtained for the barcode detected at S201. More specifically, the barcode detection result for the detected barcode is searched using the barcode location or barcode coordinate included in the barcode detection result obtained at S201.

At S204, the main controller 21 determines whether the barcode detection result previously obtained for the barcode detected at S201 is found. When it is determined that the barcode detection result previously obtained for the barcode detected at S201 is found ("YES" at S204), the operation proceeds to S205. When it is determined that the barcode detection result previously obtained for the barcode detected at S201 is not found ("NO" at S204), the operation proceeds to S210.

At S205, the main controller 21 compares the barcode detection result previously obtained for the detected barcode, which is obtained at S204, with the barcode detection result currently obtained at S201 to generate a comparison result.

At S206, the main controller 21 determines whether the comparison result indicates that the same barcode detection result is obtained for at least two times. When it is determined that the same barcode detection result is obtained for at least two times ("YES" at S206), the operation proceeds to S207 to cause the detection result output 25 to output the barcode detection result and the operation ends. When it is determined that the comparison result indicates that the different barcode detection is obtained ("NO" at S206), the operation proceeds to S208.

At S208, the main controller 21 causes the retry repeat process controller 28 to select a specific type of image processing to be applied to the image data based on the information stored in the retry repeat pattern controller 29.

At S209, under control of the retry repeat process controller 28, the image processor 26 applies the selected specific type of image processing to the image data to generate the processed image data. The processed image data is output to the barcode detection module 22.

The image processing server 20 repeats S201 to generate a barcode detection result using the different processed image data generated by applying the different image processing, and S202 to determine whether the barcode is successfully detected. This retry operation of S208, S209, S201, and S202 is repeatedly performed until the successful detection result indicating the same barcode detection result is obtained at least two times for the different processed image data generated using the different types of image processing.

Referring to S204, when it is determined that the barcode detection result previously obtained for the barcode detected at S201 is not found ("NO" at S204), the operation proceeds to S210 to check whether the image processing previously selected at S208 and applied at S209 relates to editing, or it changes information contained in the image data. For example, the types of image processing to be performed by the image processor 26 may include simple image rotation, which changes the orientation of the image data without applying the actual image processing. In such case, it is not most likely that the processed image data suffers from the image processing applied to the image data to improve the barcode detection probability. For this reason, when it is determined that the image processing being applied does not involve the actual image processing that results in changing the information, such as the pixel values, of the processed image data, the main controller 21 may end the operation of FIG. 16 as long as one successful detection result is obtained as one successful detection result is sufficient.

More specifically, at S211, the main controller 21 determines whether the image processing previously selected and applied relates to image editing, or it changes information contained in the image data. When it is determined that the image processing previously selected and applied changes the information in the image data ("YES" at S211), the operation proceeds to S208 to repeat the retry operation to obtain another successful detection result. When it is determined that the image processing previously selected and applied does not change the information contained in the image data ("NO" at S211), the operation proceeds to S207 to output the barcode detection result, and the operation ends.

In the above-described examples, the QR code and the code 39 are used for barcode detection. The QR code has the relatively high error correction capacity such that the barcode detection error is relatively low. On the other hand, the code 39 may be provided or not provided with a check digit, and suffers from the high barcode detection error. For example, as illustrated in FIG. 17, even with the check digit, the barcode detection error still occurs for some types of barcodes such as the code 39 and the NW 7. In order to suppress the barcode detection error due to the barcode type, the image processing server 20 may determine a number of successful barcode detection results required to complete the retry operation based on the type of the barcode subjected for processing. For example, as illustrated in FIG. 18, the image processing server 20 may additionally perform S301 and S302, in addition to the steps described above referring to FIG. 17.

Figure 18:
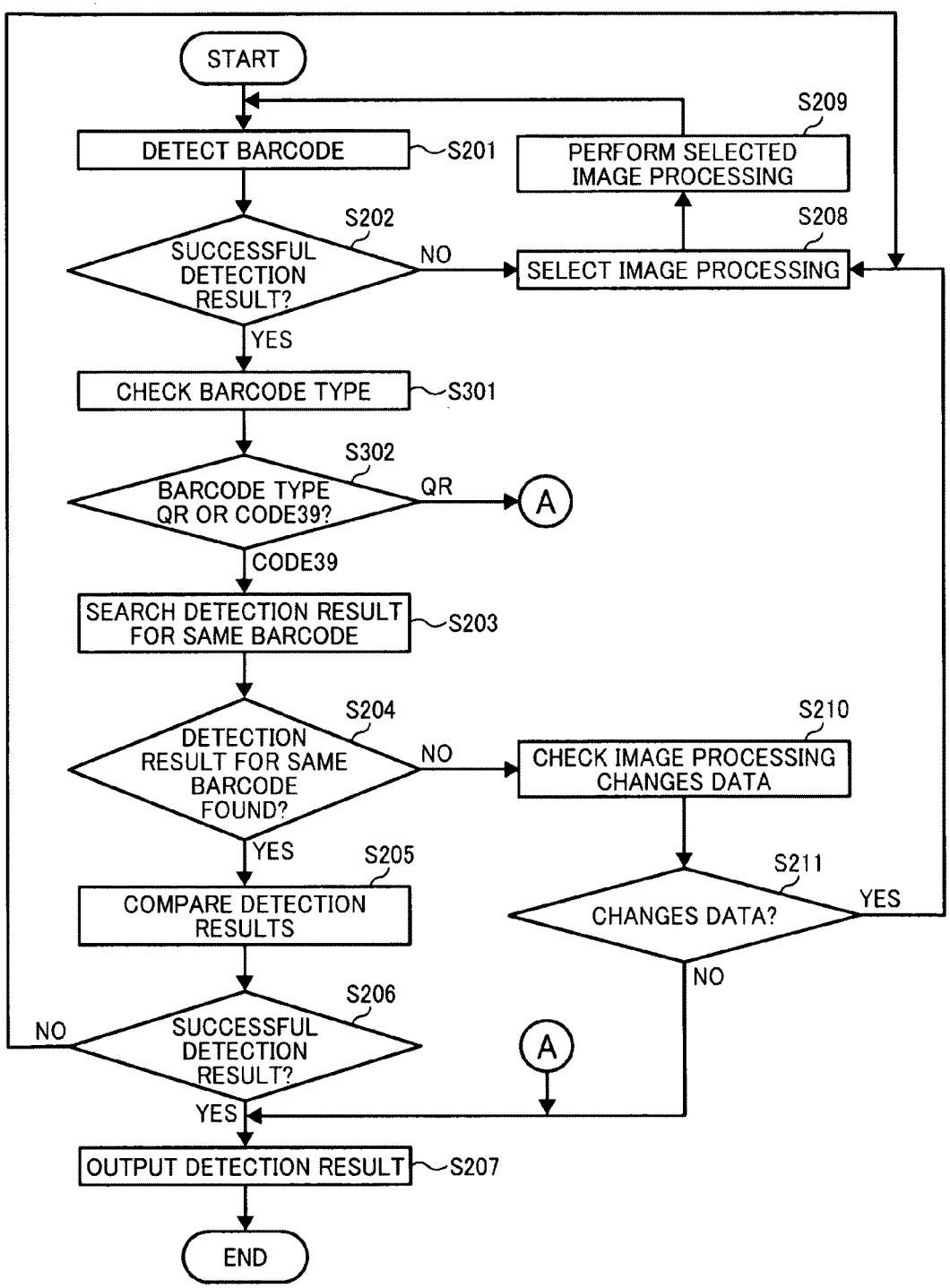
FIG. 18 is a flowchart illustrating operation of sequentially performing the retry operations of image processing and barcode detection while changing a type of image processing, performed by the image processing server of FIG. 1, according to an example embodiment of the present invention.

Referring to FIG. 18, when it is determined that the barcode is successfully detected at S202 ("YES" at S202), the operation proceeds to S301 to check the type of the barcode detected at S201. At S302, the main controller 21 determines whether the detected barcode type is QR code or code 39. When it is determined that the detected barcode type is QR code ("QR" at S302), the operation proceeds to S207 to output the barcode detection result, and the operation ends. When it is determined that the detected barcode type is code 39 ("CODE 39" at S302), the operation proceeds to S203.

In this manner as described above referring to FIG. 18, the retry number information indicating a desired number of successful detection results having the same detection result may be determined based on the type of a barcode subjected for processing. The information regarding the barcode type may be previously obtained from a user input through the management tool 40.

As described above referring to FIG. 2, the RP stored in the retry repeat pattern controller 29 indicates the combination of a plurality of types of image processing to be performed by the image processor 26 as well as the processing order in performing the plurality of types of image processing included in the image processing combination. The processing order information indicating the processing order in performing the plurality of types of image processing may be previously determined, for example, as described below, by the train data controller 32.

When the retry operation of image processing and barcode detection analysis is to be performed for all types of image processing, the processing order does not have to be considered. On the other hand, when the retry operation of image processing and barcode detection analysis is to be performed until the sufficient number of successful detection results with the same result is obtained, the order of performing a plurality of types of image processing may need to be considered. Preferably, the processing order should be determined so as to reduce the number of retry operations or the overall processing time while still achieving the high barcode detection probability.

More specifically, in order to determine the processing order of performing a plurality of types of image processing, the characteristics of each specific image processing need to be considered. The characteristics of image processing include, but not limited to, the contribution to the successful barcode detection result, the image processing time or speed, or the degree of image editing characteristics affecting the input image data after the specific image processing is applied.

FIG. 19 illustrates a list of specific types of image processing available for use by the image processor 26 and the degree of image editing characteristics for each type of image processing. The column "IMAGE PROCESSING" indicates a specific image processing to be applied, which may be expressed in terms of an image processing name or an identification number. For the descriptive purpose, FIG. 19 lists a plurality of types of image processing described above referring to FIG. 8. The "DESCRIPTION" column includes explanation or description regarding the specific type of image processing.

The "IMAGE PROCESSING DEGREE" column specifies the degree of image editing characteristics of each specific type of image processing. The degree of image processing has the value "NO" for the image processing of applying image rotation to the image data, specifically, the image processing P1, P2, and P3. The degree of image processing has the value "MEDIUM" for the image processing such as noise removal, smoothing, or grayscale processing, specifically, the image processing P9, P7, P8, P10, P4, and P6. The degree of image processing has the value "HIGH" for the image processing requiring the size conversion, specifically, the image processing P5, P11, and P12.

Further, referring to FIG. 19, the types of image processing listed in FIG. 19 may be classified into a plurality of groups based on the characteristics of image processing. More specifically, in this example, the "noise removal, smoothing, 180 rotation" P9, the "noise removal, smoothing" P7, the "noise removal, smoothing, 90 rotation" P8, and the "noise removal, smoothing, 270 rotation" P10 may be classified into one group as the types of image processing having the substantially same characteristics. The "grayscale smoothing" P4 and the "grayscale weighted average" P6 may be classified into one group as the types of image processing having the substantially same characteristics.

Figure 20:
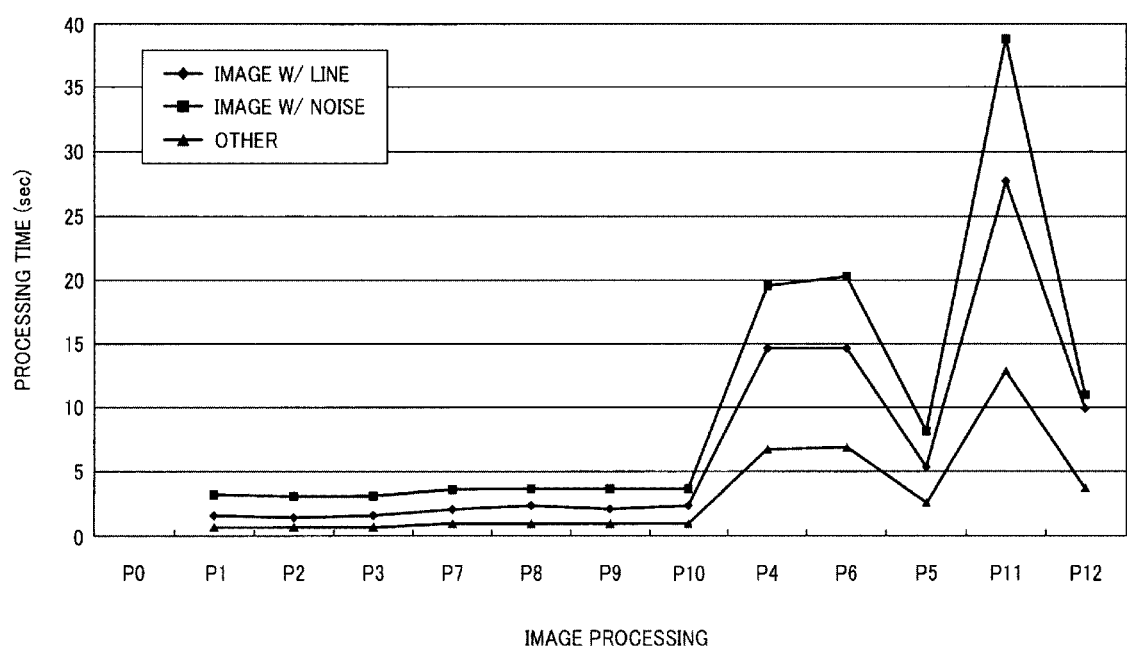
FIG. 20 is a graph illustrating processing time required for applying each type of image processing listed in FIG. 19.

FIG. 20 illustrates the processing time it requires for the image processor 26 and the barcode detection module 22 to respectively perform the retry operation of image processing and barcode detection analysis. The X axis of the graph indicates a specific type of image processing applied to the input image data. The Y axis of the graph indicates the processing time in seconds. In this example, three types of image data are used for processing including the image data having the line such as the barcode of FIG. 3B ("IMAGE WITH LINE"), and the image data having the noise ("IMAGE WITH NOISE"), and the image data having another cause that results in detection error ("OTHER"). The information illustrated in the graph of FIG. 20 may be generated by the periodic result determiner 33 based on the retry operation results stored in the retry repeat result storage 31.

Referring to FIG. 20, the image processing such as the "90 degree rotation" P1, "180 degree rotation" P2, "270 degree rotation" P3, "noise removal, smoothing" P7, "noise removal, smoothing, 90 degree rotation" P8, "noise removal, smoothing, 180 degree rotation" P9, "noise removal, smoothing, 270 degree rotation" P10, and "grayscale zoom 70%" P5 each have the high processing speed, requiring the less processing time. The image processing such as the "grayscale high image quality 200%" P11 has the low processing speed, requiring the longer processing time.

Figure 21:
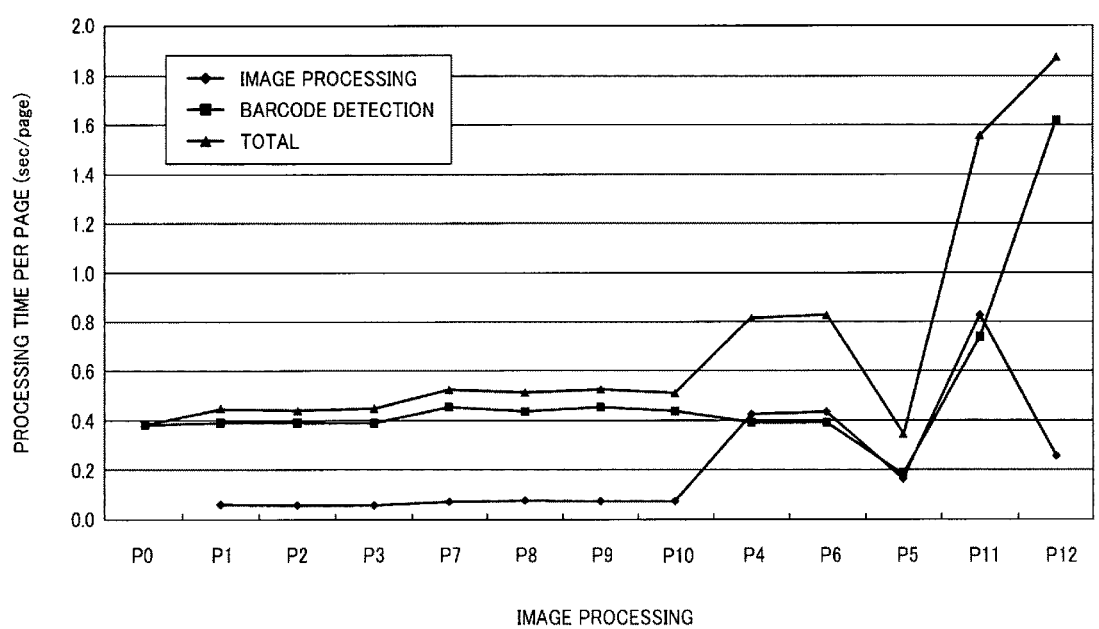
FIG. 21 is a graph illustrating the average processing time per page of the image data required for applying each type of image processing listed in FIG. 19.

FIG. 21 illustrates the average processing time, which indicates the processing time it requires for the image processing server 20 to process one page of image data. The X axis of the graph of FIG. 21 indicates a specific type of image processing. The Y axis of the graph indicates the average processing time per page in seconds/page. In this example, the average processing time is obtained respectively for the operation of applying image processing performed by the image processor 26 ("IMAGE PROCESSING"), the operation of barcode detection and analysis performed by the barcode detection module 22 ("BARCODE DETECTION"), and the overall retry operation of image processing and barcode detection analysis ("TOTAL"). The information illustrated in the graph of FIG. 20 may be generated by the periodic result determiner 33 based on the information illustrated in the graph of FIG. 20, which is generated based on the retry operation results stored in the retry repeat result storage 31.

Referring to FIG. 21, the average processing speed tends to increase as the size of the processed image data subjected for barcode detection increases. More specifically, when the image processing "grayscale zoom 70%" P5 is applied to generate the processed image data having an image size smaller than that of the original image, the processing time decreases. When the image processing "grayscale high image quality 200%" P11 and the image processing "mono 300%" P12 is applied to generate the processed image data having an image size larger than that of the original image, the processing time increases. When the processed image data has an image size substantially the same as the original image size, the processing time remains unchanged.

Figure 22:
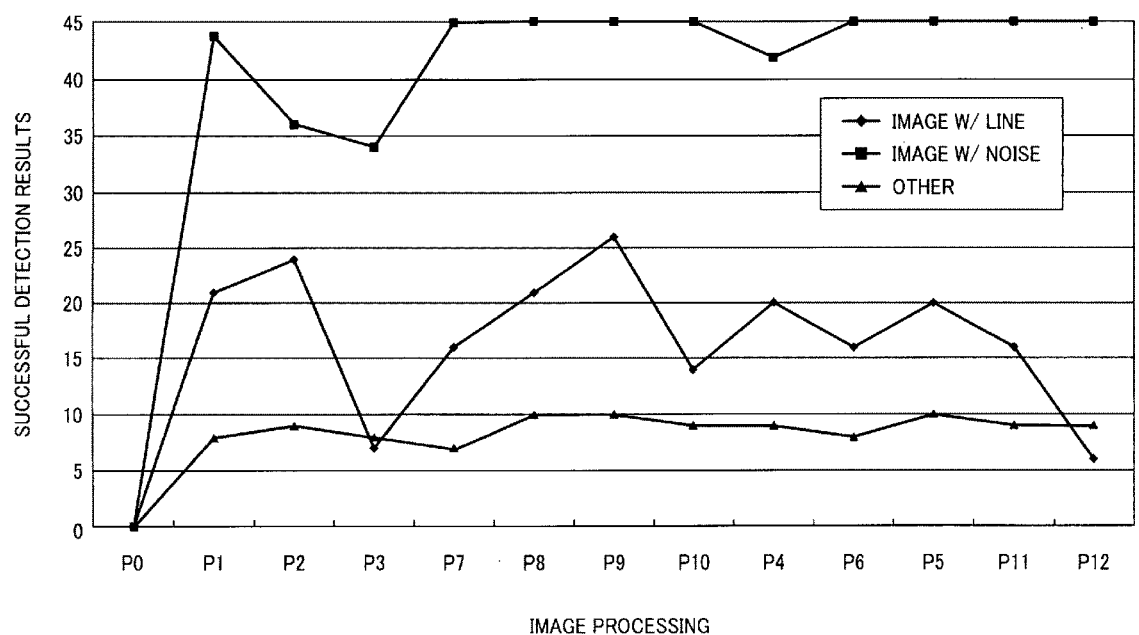
FIG. 22 is a graph illustrating the number of successful detection results obtained after applying each type of image processing listed in FIG. 19.

FIG. 22 illustrates the number of successful barcode detection results obtained by the image processing server 20 after applying the specific type of image processing to the input image data. The X axis of the graph indicates the specific type of image processing. The Y axis of the graph indicates the number of successful detection results obtained after applying the specific image processing. In this example, the successful barcode detection result is obtained for each specific image processing and for different types of image data. Further, in this example, the barcode type is the QR code. The type of image data is determined based on the characteristics of the image data that possibly causes a barcode detection error. More specifically, in this example, the image data having the line such as the barcode of FIG. 3B ("IMAGE WITH LINE"), and the image data having the noise ("IMAGE WITH NOISE"), and the image data having another cause that results in detection error ("OTHER") are subjected for the retry operation. The information illustrated in the graph of FIG. 22 may be generated by the periodic result determiner 33 based on the retry operation results stored in the retry repeat result storage 31.

Referring to FIG. 22, even when the same type of image processing is applied to the image data, the barcode detection probability differs depending on the type of the image data.

Based on the analysis of the barcode detection result described above, the train data controller 32 may determine the processing order, for example, as described blow referring to FIGS. 23 to 28 to generate a plurality of repeat patterns.

Figure 23A:
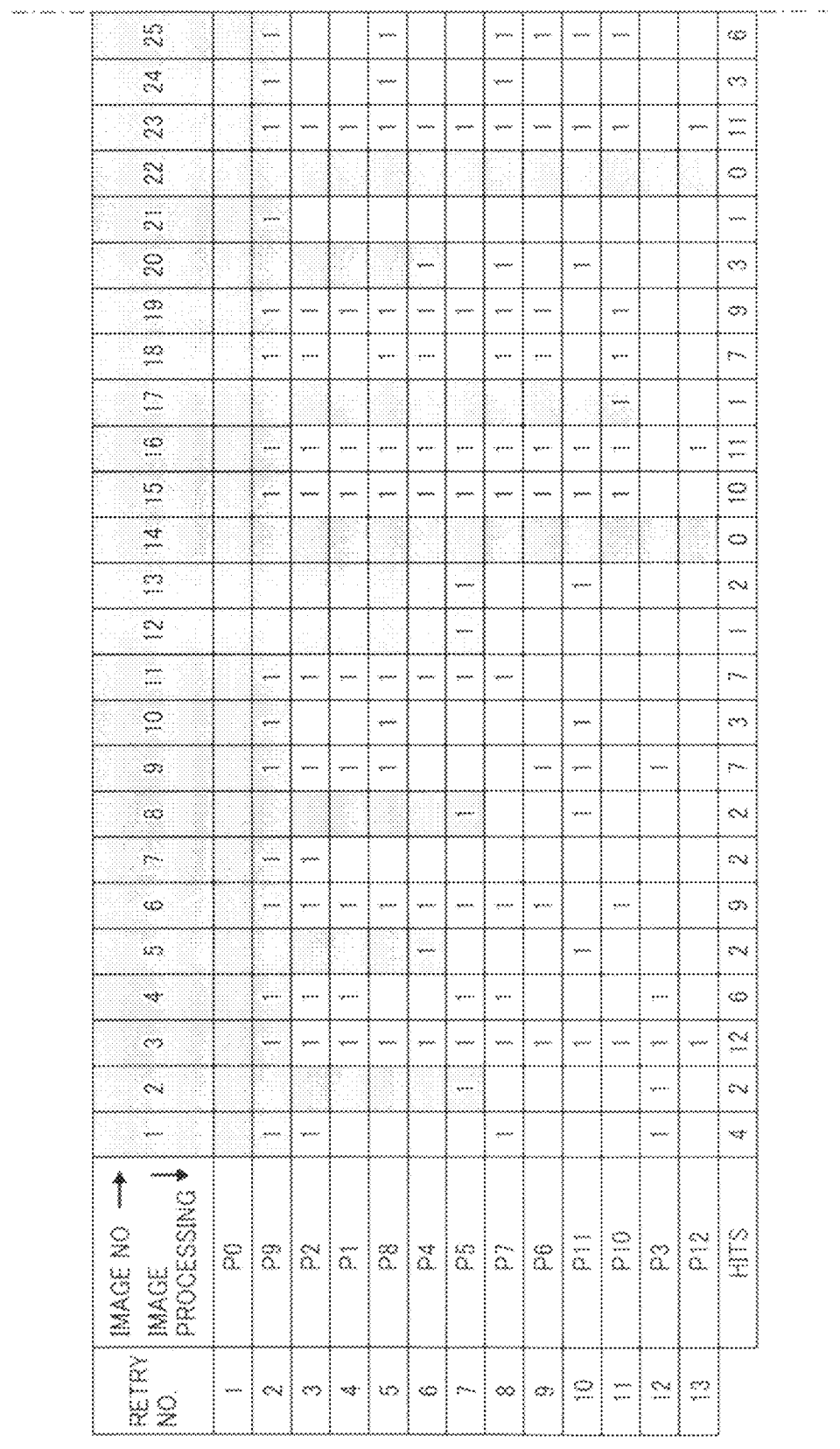

In one example, the train data controller 32 may generate a repeat pattern, which causes the image processing server 20 to perform a plurality of types of image processing in the order determined based on the barcode detection probability, thus reducing the number of retry operations required to obtain a predetermined number of successful detection results. FIG. 23 is a table, which lists different types of image processing illustrated in FIG. 19 in the order from the image processing having the highest number of successful detection results to the image processing having the lowest number of successful detection results. The "RETRY NO" column indicates a processing order. The "IMAGE NO" column indicates the number uniquely assigned to each sample image data. The "IMAGE PROCESSING" column indicates a specific type of image processing to be applied, which is expressed in identification number P0 to P12. The column C1 indicates the total number of successful detection results obtained for the specific type of image processing. The column C2 indicates the average processing time in seconds/page for the specific type of image processing. The column C3 indicates the degree of image processing for the specific type of image processing. The column C4 indicates the number of sample image data that are not successful detected. The column C5 indicates the total processing time for performing the retry operation. The column C6 indicates the accumulated total processing time for sequentially performing the retry operations.

Figure 24A:
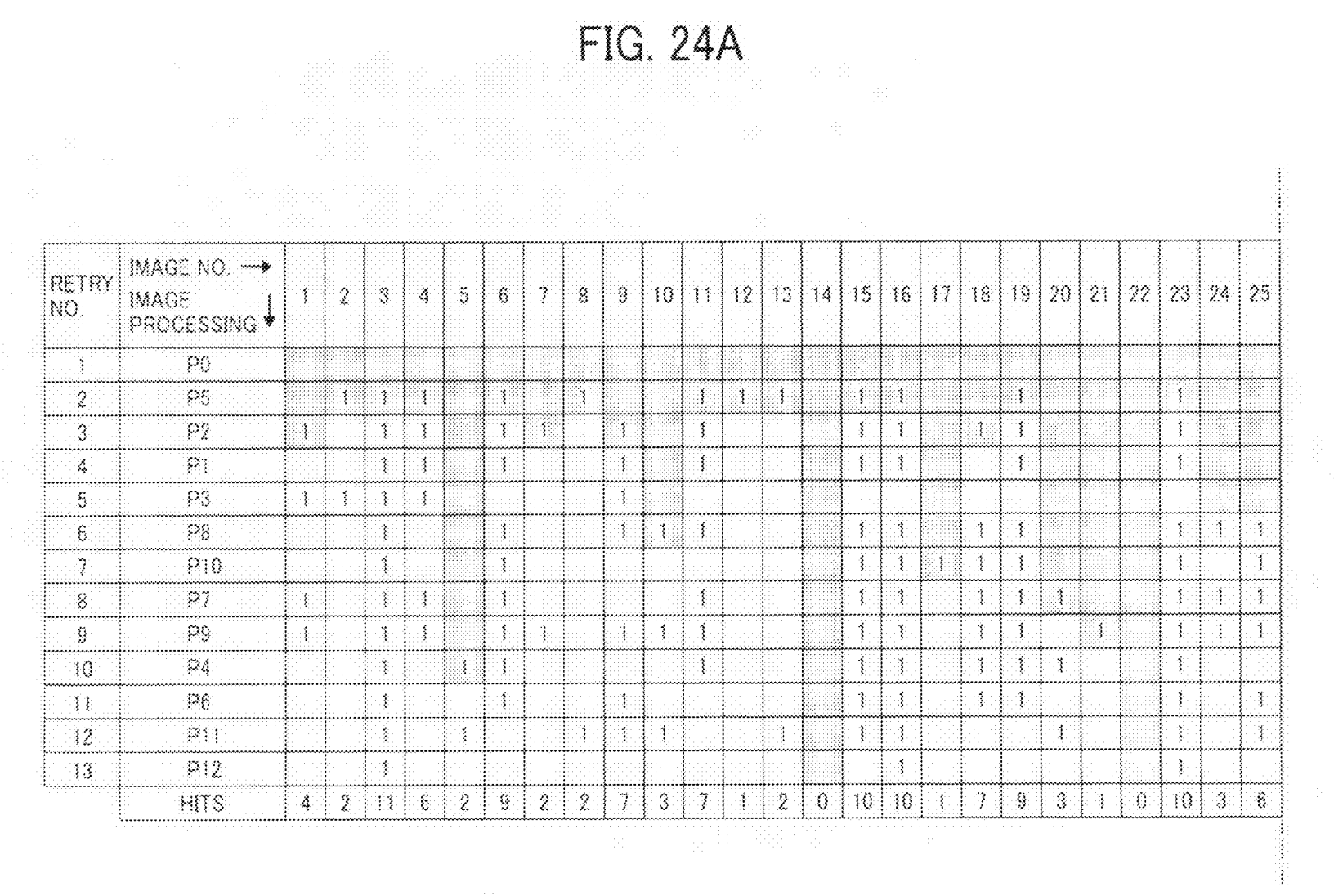

In another example, the train data controller 32 may generate a repeat pattern, which causes the image processing server 20 to perform a plurality of types of image processing in the order determined based on the processing time or speed, thus reducing the processing time required to obtain a predetermined number of successful detection results. FIG. 24 is a table, which lists different types of image processing illustrated in FIG. 19 in the order from the image processing having the lowest processing time to the image processing having the highest processing time.

Figure 25A:
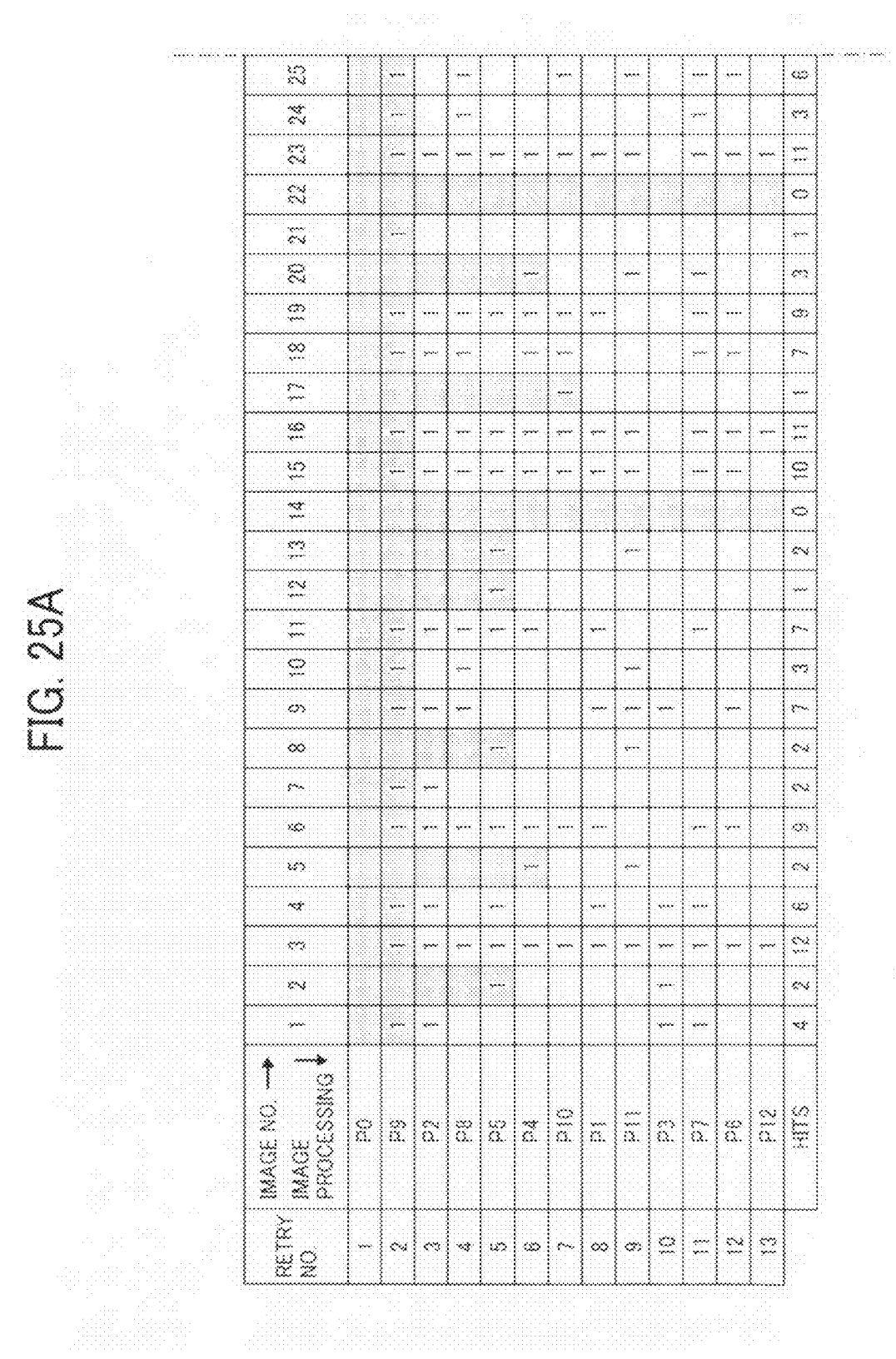

In another example, the train data controller 32 may generate a repeat pattern, which causes the image processing server 20 to perform a plurality of types of image processing in the optimized order determined based on the characteristics of type of image processing in addition to the barcode detection probability and the processing time. FIG. 25 is a table, which lists different types of image processing illustrated in FIG. 19 in the order previously determined as the most efficient order, or the optimized order, in view of the number of successful barcode detection results, the processing speed, and the characteristics of the image processing such as the degree of image processing.

More specifically, in the case of the table of FIG. 25, the processing order is determined such that a plurality of types of image processing that are sequentially performed in order have substantially different characteristics. For example, when the image processing sequentially applied are substantially the same in characteristics, the image processing server 20 is most likely to sequentially output the detection result in error. More specifically, as illustrated in the example case of applying the image processing in the order determined based on the processing speed referring to FIG. 24, the image processor 26 tends to apply the image processing having substantially the same characteristics, which may belong into the same group, to the input image data. This may increase the barcode detection error. Further, referring back to FIG. 19, by applying the image processing having substantially the same characteristics, the information contained in the image data may greatly change. For this reason, as illustrated in FIG. 25, the order of image processing to be applied is determined so as to avoid the sequential operation of a plurality of types of image processing having substantially the same characteristics. More specifically, in this example, the order of image processing to be applied is determined such that a plurality of types of image processing that are substantially different in characteristics from each other are sequentially applied. For example, the "noise removal, smoothing, 180 rotation" P9, the "noise removal, smoothing" P7, the "noise removal, smoothing, 90 rotation" P8, and the "noise removal, smoothing, 270 rotation" P10, which are classified into the same group based on their characteristics, are not sequentially preformed. The "grayscale smoothing" P4 and the "grayscale weighted average" P6, which are classified into the same group based on their characteristics, are not sequentially performed.

The retry repeat pattern controller 29 may store information stored in the table illustrated in any one of FIGS. 23 to 25 as the RP. Further, in this example, the RP stores the retry number information indicating that the image processing server 20 ends the retry operation when the image processing server 20 obtains the successful detection result for at least one time. According to the retry number information, the combination of the plurality of types of image processing may be determined as described above referring to FIGS. 10 to 12.

According to the RP stored in the form of any one of the tables of FIGS. 23 to 25, the image processing server 20 performs the retry operation. The selection of the RP may be determined based on, for example, according to a user instruction regarding the selected mode as described above referring to FIG. 9. For example, when the RP of FIG. 23 is selected, the image processing server 20 obtains a barcode detection error as indicated by the first row of the table of FIG. 23 in which no value is input for the successful detection result specified by the column C1. As indicated by the "RETRY NO", the image processing "noise removal, smoothing, 180 rotation" P9 is applied to the image data with the image number 1 to generate the processed image data 1. As indicated by the value of the successful detection result for the image data 1, the barcode is successfully detected in the processed image data 1. Since the successful detection result is obtained for the processed image data 1, the image processing server 20 proceeds to perform the retry operation on the next image data with the image number 2.

In a substantially similar manner, the processing order information regarding the processing order in applying specific image processing may be determined and stored in the form of table, when the image processing server 20 requires that the same barcode detection result to be obtained for different types of image processing at least two times. According to the retry number information indicating that at least two successful detection results having the same results should be obtained, the combination of the plurality of types of image processing may be determined as described above referring to FIGS. 14 to 15.

In one example, the train data controller 32 may generate a repeat pattern, which causes the image processing server 20 to perform a plurality of types of image processing in the order determined based on the barcode detection probability, thus reducing the number of retry operations required to obtain a predetermined number of successful detection results. FIG. 26 is a table, which lists different types of image processing illustrated in FIG. 19 in the order from the image processing having the highest number of successful detection results to the image processing having the lowest number of successful detection results, in case when the same barcode detection result should be obtained at least two times.

Figure 27A:
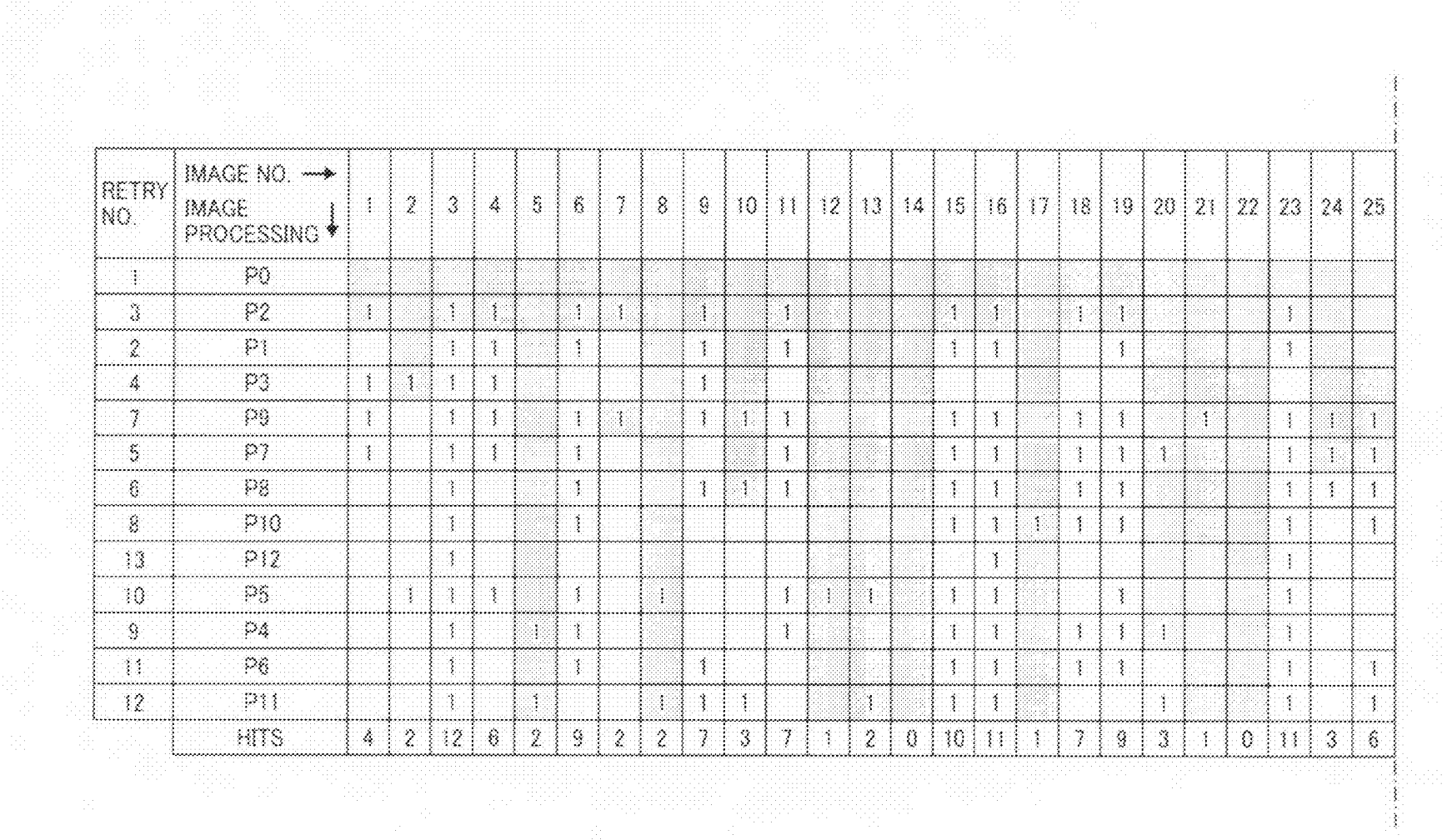
Figure 27B:
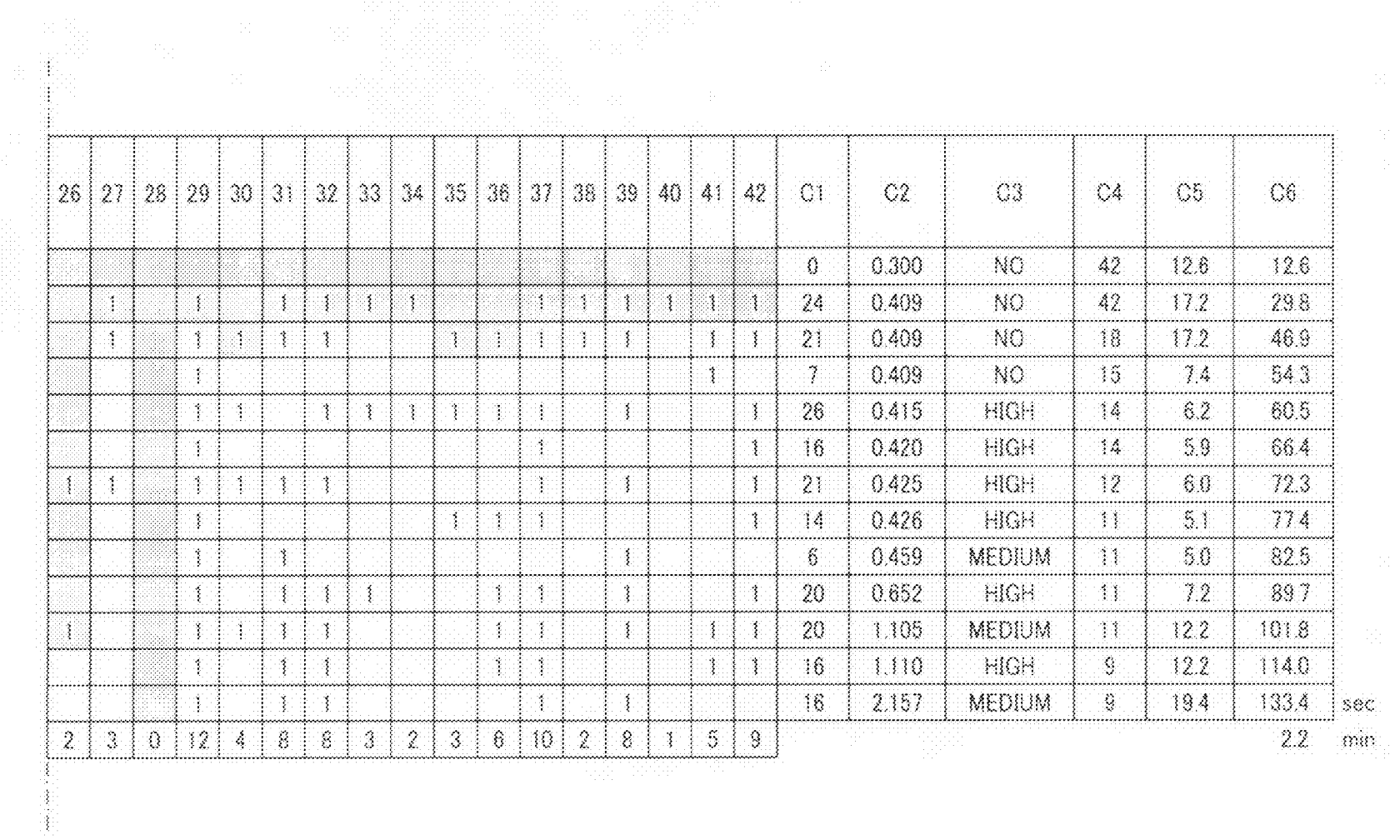

In another example, the train data controller 32 may generate a repeat pattern, which causes the image processing server 20 to perform a plurality of types of image processing in the order determined based on the processing time or speed, thus reducing the processing time required to obtain a predetermined number of successful detection results. FIG. 27 is a table, which lists different types of image processing illustrated in FIG. 19 in the order from the image processing having the lowest processing time to the image processing having the highest processing time, in case when the same barcode detection result should be obtained at least two times.

In another example, the train data controller 32 may generate a repeat pattern, which causes the image processing server 20 to perform a plurality of types of image processing in the optimized order determined based on the characteristics of type of image processing in addition to the barcode detection probability and the processing time. FIG. 28 is a table, which lists different types of image processing illustrated in FIG. 19 in the order previously determined as the most efficient order, or the optimized order, in view of the number of successful barcode detection results, the processing speed, and the characteristics of the image processing such as the degree of image processing, in case when the same barcode detection result should be obtained at least two times.

Further, in the example case illustrated in any one of FIGS. 26 to 28, when the simple image rotation is applied, which does not cause the processed image data to be different than the original image data in contained information, the image processing server 20 may end the retry operation as long as the successful detection result is obtained at least one time, as described above referring to FIG. 16.

FIG. 29 illustrates a result of the retry operation performed by the image processing server 20 based on various RPs stored in the retry repeat pattern controller 29. In this example, 8000 pages of image data are processed for barcode detection.

The "IMAGE PROCESSING" column specifies the type of retry operation indicated by the RP and referred by the main controller 21 when performing the retry operation. In this example, FIG. 29 lists the retry operations including "NO", "ALL", "HITS, 1", "SPEED, 1", "OPTIMIZED, 1", "QR, ALL", "HITS, 2", "SPEED, 2", "OPTIMIZED, 2", and "CODE39, ALL". The retry operation "NO" indicates that no image processing is applied to the input image data. The retry operation "ALL" indicates that all types of image processing available for use are applied. The retry operation "HITS, 1" indicates that a plurality of types of image processing is applied in the order determined based on the successful detection results until the successful detection result is obtained for one time, as described above referring to FIG. 23. The retry operation "SPEED, 1" indicates that a plurality of types of image processing is applied in the order determined based on the processing speed until the successful detection result is obtained for one time, as described above referring to FIG. 24. The retry operation "OPTIMIZED, 1" indicates that a plurality of types of image processing is applied in the optimized order until the successful detection result is obtained for one time, as described above referring to FIG. 25. The retry operation "QR, ALL" indicates that all six types of image processing designed for QR code are applied. The retry operation "HITS, 2" indicates that a plurality of types of image processing is applied in the order determined based on the successful detection results until the successful detection result is obtained for two times, as described above referring to FIG. 26. The "SPEED, 2" indicates that a plurality of types of image processing is applied in the order determined based on the processing speed until the successful detection result is obtained for two times, as described above referring to FIG. 27. The retry operation "OPTIMIZED, 2" indicates that a plurality of types of image processing is applied in the optimized order until the successful detection result is obtained for two times, as described above referring to FIG. 28. The retry operation "CODE39, ALL" indicates that all 11 types of image processing designed for the QR code are applied.

The "PROCESSING TIME" column specifies the total processing time in seconds required for performing the retry operation for each one of the retry operations. The "PROCESSING TIME INCREASE" column specifies the increase in total processing time with respect to the original processing time obtained when no image processing is performed, for each one of the retry operations. The processing time increase is expressed in percentage. The "DETECTION ERROR" column specifies the number of barcode detection errors obtained for each one of the retry operations. The "DETECTION ERROR RATE" column specifies the detection error occurrence probability, or the detection error rate, obtained for each one of the retry operations, which is expressed in percentage.

Figure 30:
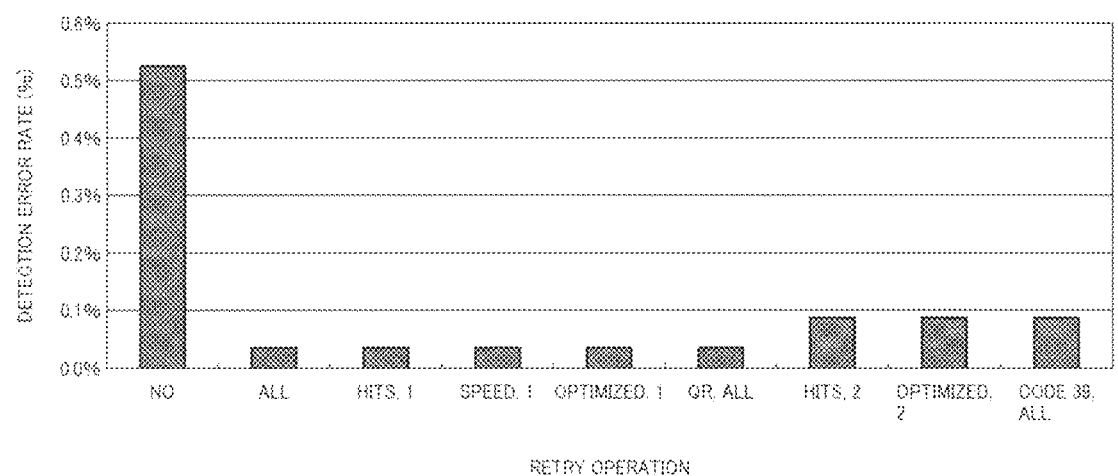
FIG. 30 is a graph illustrating the barcode detection error rate obtained for a different pattern of retry operation.

FIG. 30 illustrates the detection error rate obtained for each one of the retry operations listed in the table of FIG. 30, under the same condition as described above referring to FIG. 29. In the example illustrated in FIG. 30, the "SPEED, 2" retry operation is not considered based on the assumption that it sequentially performs a plurality of types of image processing having substantially the same characteristics as described above.

In the example case illustrated in FIGS. 29 and 30, without any image processing, the image processing server 20 outputs a barcode detection error for 42 pages of image data out of 8000 pages of image data subjected for processing, resulting in about 0.5% of barcode detection error rate.

In the case of retry operation "ALL", the image processing server 20 causes the image processor 26 to apply all types of image processing, causes the barcode detection module 22 to detect and analyze the barcode to generate a barcode detection result, and further causes the barcode detection result processor 23 to merge the barcode detection results into a barcode detection result for output. Applying the retry operation "ALL" reduces the detection error rate to be about 0.04%, which is about ten times smaller than the detection error rate for the original image data. However, since the processing time increases by 2317.9%, applying the retry operation "ALL" may not be practical.

On the other hand, applying a combination of a plurality of types of image processing, which is determined based on information regarding the barcode, sufficiently reduces the detection error rate without requiring the longer processing time. In the case of retry operation "QR, ALL", the image processing server 20 causes the image processor 26 to apply all types of image processing designed for the QR code, and further causes the barcode detection module 22 to detect and analyze the barcode to generate a barcode detection result. The barcode detection results are then merged by the barcode detection result processor 23 into a barcode detection result for output. Applying the retry operation "QR, ALL" reduces the detection error rate to be about 0.04%, with the increased processing time of 823.3%.

When there is information obtained for the barcode such as information regarding the barcode type, the number of barcodes, etc., the image processing server 20 is able to obtain a sufficient number of the successful detection results relatively easily by performing the retry operation one time or two times. This greatly reduces the overall processing time, while still achieving the low detection error rate.

Further, applying a combination of a plurality of types of image processing according to the repeat pattern generated by the train data controller 32 further reduces the processing time. Even when information regarding the barcode subjected for detection such as the type or number of barcode is not obtained, the image processing server 20 is able to obtain a successful barcode detection result with less time by sequentially performing a plurality of types of image processing according to the image processing type information, the processing order information, or the retry number information, which may be stored as the repeat pattern.

Further, in this example, the barcode detection module 22 is able to detect a plurality of types of barcodes or a plurality of number of barcodes such that the barcode may be easily detected without requiring the additional work by the user. For example, assuming that a plurality of types of bar code is included in the input image data, once the barcode is specified as the standard A, the barcode detection module 22 automatically detects the barcode location as well as the barcode detection result for the standard A barcode even without information regarding the barcode location or the image orientation. This improves the operability for the user. For example, the technique other than the barcode detection to correctly detect a barcode, such as detecting a timing mark, applying skew correction, or detecting the barcode orientation, does not have to be performed, thus suppressing the barcode detection error that may be caused due to the application of the above-described processing.

Further, in this example, when the input image data includes more than one standard A barcode, the image processing server 20 needs to read all barcodes before completion of the retry operation. If the user can specify the barcode type or the number of barcodes in the input image data, such information may be input to the image processing server 20 through the management tool 30. Based on the registered information, the main controller 21 of the image processing server 20 may continue performing the retry operation until all barcodes are read out from the input image data.

When the user is not able to specify the number of barcodes included in the input image data, the image processing server 20 may be caused to continue performing the retry operation for a predetermined number of times or until all types of image processing are applied to generate a plurality of barcode detection results. The barcode detection module 21 may merge the plurality of barcode detection results into the barcode detection result indicating various information regarding the barcode such as the barcode location, the coordinate information, the barcode type, and the barcode detection result. When it is determined that the different barcode detection result is obtained for the barcode located at the same location in the input image data, the largest number of barcode detection results may be used. By merging the plurality of detection results, the barcode is detected with high accuracy.

On the other hand, the image processing server 20 may be caused to complete the retry operation as long as the successful detection result is obtained for one time without performing further image processing. Referring to FIG. 29, this sufficiently reduces the overall processing time such that the increase in overall processing time with respect to the original processing time is kept between 1.5% and 2.8%. Since the detection error probability is 0.04%, the barcode detection probability greatly improves.

Still referring to FIG. 29, in the case of performing the retry operation requiring the successful detection results for two times, the detection error probability is about 0.09%, which is greater than the case of applying all types of image processing. However, the detection error probability is still improved with respect to the case of not applying image processing. Further, the increase in processing time ranges between 4.4% and 4.6%.

However, in case of performing the retry operation based on the processing speed, the types of image processing having substantially the same characteristics are sequentially applied such that it may cause a barcode detection error. For this reason, it is not preferable to perform the retry operation based on the processing speed for more than one time.

As illustrated in FIG. 29, when all types of image processing are to be performed, the overall processing time tends to be long. On the other hand, when the retry operation ends after obtaining a predetermined number of the successful detection results, the overall processing time is not long.

Further, the barcode detection capability of the image processing server 20 may decrease, for example, as the basic technique used for barcode detection becomes obsolete or when the input image data input to the image processing server 20 is not in good quality. For example, the input image data may not be in good quality due to the degradation in the scanner of the MFP 10 or due to the change in characteristics of the scanner of the MFP 10. In such case, the barcode detection results may differ among various image processing applied to the input image data. When the successful detection result is hardly obtained, the image processing server 20 may notify the user.

More specifically, the retry repeat result processor 30 of the image processing server 20 collects the barcode detection results, and stores the collected barcode detection results in the retry repeat result storage 31. The periodic result determiner 33 determines whether the retry operation effectively causes to generate the successful detection result based on the collected barcode detection results stored in the retry repeat result storage 31. When it is determined that the retry operation is not effective in barcode detection, the periodic result determiner 33 causes the alert processor 34 to send an alert message to the management tool 40. For example, when it is determined that the number of retry operations sequentially performed in order to obtain the successful detection results increases in average, the alert message is generated. In another example, when it is determined that the overall processing time for the retry operation increases in average, the alert message is generated.

Further, the information stored in the retry repeat result storage 31 may be used by the train data controller 32 to select the types of image processing to be performed or the priority order of performing specific image processing. In other words, the train data controller 32 uses the information stored in the retry repeat result storage 31 as train data to improve the behavior of the image processing server 20.

Further, as described above, the barcode detection module 22 is provided with the barcode detector 22a and the barcode analyzer 22b. In order to effectively detect the barcode location, the barcode detector 22a may extract an area to be processed for barcode detection in two steps.

Figure 31A:
FIG. 31A is example image data to be processed by the image processing server of FIG. 1 for barcode detection.
Figure 31B:
FIG. 31B is an illustration for explaining first extraction process performed by the image processing server of FIG. 1 for barcode detection.

Assuming that the input image data of FIG. 31A is input to the barcode detection module 22 for barcode detection and analysis. The barcode detector 22a selects a portion in the input image data, which the barcode detector 22a interprets as the barcode, as indicated by "B" in FIG. 31A. Referring to FIG. 31B, the barcode detector 22a firstly extracts a section S surrounding the selected portion B from the input image data for further processing. This extraction process is referred to as first extraction process. After the first extraction process, the barcode detector 22a extracts, from the firstly extracted section S, a section to be used for barcode detection.

The barcode location detection as well as the barcode type determination usually requires longer processing time as compared with the barcode analysis. For this reason, in order to reduce the overall processing time for the retry operation, at the time of performing the retry operation, the barcode detector 22a may only try to detect the barcode in the firstly extracted section previously selected by the first extraction process.

Since the barcode location detection is performed by extracting an area from the input image data in two steps, the barcode detection module 22 does not have to process all areas of the input image data such that the barcode analysis performed by the barcode analyzer 22b may require less processing time. Especially when sequentially performing the retry operations, the processing time is greatly reduced.

Further, when detecting the barcode in the processed area of the image data, the processed area in which the barcode is not included may affect the operation of detecting the barcode. By extracting the processed area in two steps, the negative effects that may be otherwise caused by the processed area in which the barcode is not included may be suppressed.

While performing the first extraction process for only one time greatly reduces the overall processing time, the first extraction process may need to be repeated, for example, due to the failure in barcode detection. In view of this, the barcode detection module 22 may rotate the image data, for example, by 90 degrees, 180 degrees, and 270 degrees, and performs the first extraction process respectively on the rotated image data to obtain the barcode detection results. The barcode detection module 22 merges the barcode detection results to extract a firstly extracted area to be processed, and performs second extracting process on the firstly extracted area.

Alternatively, when the barcode detection module 22 has information regarding the barcode location or the barcode size, which may be sent by the user through the management tool 40, the barcode detector 22a may determine the firstly extracted area based on the information input by the user.

Alternatively, even when the user does not specify the barcode size, the barcode detector 22a may determine the barcode size based on various information such as the barcode type, the maximum number of characters in the barcode, or the minimum cell size. Based on the determined barcode size, the barcode detector 22a may specify the firstly extracted area. When the barcode detector 22a does not detect any barcode in the firstly extracted area, the barcode detector 22a may adjust the size of the firstly extracted area by increasing or decreasing the firstly extracted area size to search for the barcode again. The firstly extracted area size may be increased or decreased gradually in several steps until the barcode is successfully detected.

Alternatively, when there is no information provided by the user regarding the barcode location, the barcode detector 22a may firstly divide the input image data into a plurality of sections, and performs detection and analysis separately for each one of the plurality of sections. The number of divisions may be increased gradually in steps until the barcode is successfully detected.

As described above, with the image processing server 20 of FIG. 2, the barcode detection probability greatly improves when a barcode detection error occurs for various reasons. For example, even when the characteristics of various devices such as the barcode detection engine, the printer that outputs the original document, or the scanner that outputs the input image data, etc., is not known, the image processing server 20 is able to improve the barcode detection probability by performing the retry operation determined based on the collected results. In another example, even when various condition changes as the time passes, the image processing server 20 is able to improve the barcode detection probability by performing the retry operation determined based on the collected results.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

In another example, the image processing server 20 may obtain the input image data for processing in various ways other than from the scanner of the MFP 10. For example, the image processing server 20 may receive the input image data from a portable device such as a digital camera, a portable phone, or any desired personal digital assistant (PDA) device. In another example, the image processing server 20 may receive the input image data from a facsimile device of the MFP 10, when the facsimile device is provided that sends facsimile data to the image processing server 20 through a communication line.

In another example, any one of the above-described functional blocks of the image processing server 20 of FIG. 2 may be provided at different locations, for example, at various different locations on the network.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, an image processing system is provided, which includes a scanner and an image processing server. The scanner reads an original document into image data. The image processing server receives the image data from the scanner as input image data, applies image processing to the input image data to generate processed image data, and sends the unprocessed or processed image data to a network. The image processing server includes: means for detecting a barcode in the input image data; and means for analyzing the detected barcode to obtain information from the barcode. When the image processing server fails to detect or analyze the barcode in the input image data, the image processing server sequentially applies a plurality of retry operations with each retry operation including a set of image processing operation and barcode detection analysis operation to the input image data, while changing the type of image processing being applied for each retry operation, to obtain a barcode detection result.

In another example, the means for detecting includes means for specifying the location or the type of the barcode in the input image data.

In another example, the image processing server further includes: means for setting bibliographic information of the original document based on the barcode detection result; and means for dividing the unprocessed or processed image data into more than one section and sending the unprocessed or processed image data by section.

In another example, the image processing server performs the retry operations such that the types of image processing having substantially the same characteristics are not sequentially performed. When the barcode detection result having the same information is obtained for more than a predetermined number, the image processing server ends the retry operation to output the barcode detection result.

In another example, when the barcode detection result is successfully obtained from the processed image data to which image processing that does not substantially change the input image data is applied, the image processing server ends the retry operation to output the barcode detection result. The image processing that does not substantially change the input image data includes, for example, the type of image processing that does not perform the substantial editing process.

In another example, the number of performing the retry operation may be set according to the user preference.

In another example, the image processing server sets the type of the barcode for detection and analysis, and selects the type of image processing of the retry operation according to the type of the barcode.

In another example, the type of image processing of the retry operation includes rotating the input image data by a degree determined based on a predetermined unit of angle.

In another example, the type of image processing of the retry operation includes processing to thicken or thin a line in the input image data to compensate the thinned or thickened line caused by an optical writing system of the scanner.

In another example, the type of image processing of the retry operation includes smoothing processing and image size enlargement or reduction.

In another example, the image processing of the retry operation includes sharpening the input image data.

In another example, the image processing server further includes means for collecting a retry operation result indicating a result of performing the retry operation, the retry operation result including at least one of information indicating the total number of retry operations performed to obtain the successful detection result, information indicating the processing time required for performing the retry operation, and information indicating a barcode detection result obtained after performing the retry operation. The image processing server further includes means for sending an alert message to the user based on the collected retry operation result.

In another example, the image processing server further includes means for determining an order of performing the image processing of the retry operation based on the barcode detection result previously obtained.

In another example, the image processing server extracts an area that is assumed to include the barcode as a firstly extracted section, and applies the retry operation to the firstly extracted section of the image data.

In another example, an image processing server is provided to receive image data from a scanner, apply image processing to the input image data to generate processed image data, and send the unprocessed or processed image data to a network. The image processing server includes: means for detecting a barcode in the input image data; and means for analyzing the detected barcode to obtain information from the barcode. When the image processing server fails to detect or analyze the barcode in the input image data, the image processing server sequentially applies a plurality of retry operations with each retry operation including a set of image processing operation and barcode detection analysis operation to the input image data, while changing the type of image processing being applied for each retry operation, to obtain a barcode detection result.

In one example, the above-described image processing server may be implemented as a multifunctional apparatus.

In another example, an image processing method performed by an image processing system is provided, which includes the steps of: reading an original document into image data; detecting a barcode in the input image data; analyzing the detected barcode to obtain information from the barcode; determining whether the barcode in the input image data is detected or analyzed; applying a retry operation including a set of image processing operation and barcode detection analysis operation to the input image, while changing the type of image processing being applied for each retry operation to obtain, to obtain a barcode detection result; and sending the unprocessed image data or processed image data to a network.

In another example, an image processing method performed by an image processing server is provided, which includes the steps of: receiving image data scanned from an original document; detecting a barcode in the input image data; analyzing the detected barcode to obtain information from the barcode; determining whether the barcode in the input image data is detected or analyzed; applying a retry operation including a set of image processing operation and barcode detection analysis operation to the input image, while changing the type of image processing being applied for each retry operation to obtain, to obtain a barcode detection result; and sending the unprocessed image data or processed image data to a network.

What is claimed is:

1. An image processing apparatus, comprising:
a barcode detector configured to perform a barcode detection analysis operation of detecting and analyzing a barcode in image data to generate a barcode detection result;
an image processor configured to perform an image processing operation of applying image processing to the image data to generate processed image data when the barcode detection result indicates an error in barcode detection or analysis; and
a controller configured to cause the image processor and the barcode detector to sequentially perform a plurality of retry operations each of which including a set of the image processing operation and the barcode detection analysis operation until one or more successful detection results are obtained, while causing the image processor to change a type of the image processing being applied for each retry operation.

2. The image processing apparatus of claim 1, further comprising:
a storage device configured to store a plurality of retry patterns each retry pattern including at least one of: 1) image processing type information indicating a plurality of types of the image processing to be applied by the image processor; 2) processing order information indicating the order of applying the plurality of types of the image processing as the retry operations are sequentially performed; and 3) retry number information indicating a sufficient number of the successful detection results the image processing apparatus requires before completing the retry operations, wherein
the controller selects one of the plurality of retry patterns and controls the retry operations according to at least one of the image processing type information, the processing order information, and the retry number information obtained from the selected retry pattern.

3. The image processing apparatus of claim 2, wherein the image processing type information of at least one of the plurality of repeat patterns is determined such that the plurality of types of image processing to be applied by the image processor have substantially different characteristics so as to compensate the weakness of each other.

4. The image processing apparatus of claim 3, wherein the controller selects one of the plurality of retry patterns based on at least one of: 1) characteristics of a scanner that generates the image data from an original document; and 2) characteristics of a printer that outputs the original document, so as to control the retry operations according to the selected retry pattern having the image processing type information that causes the image processor to apply monochrome smoothing to correct a barcode line thickness in the image data.

5. The image processing apparatus of claim 3, wherein the controller selects one of the plurality of retry patterns based on at least one of 1) a type of the barcode in the image data; and 2) characteristics of the barcode detector, so as to control the retry operations according to the selected retry pattern having the image processing type information determined based on at least one of the type of the barcode and the characteristics of the barcode detector.

6. The image processing apparatus of claim 5, wherein when the characteristics of the barcode detector indicates that the barcode detector supports the grayscale data, the controller selects the repeat pattern that causes the image processor to apply grayscale processing to the image data to generate grayscale data.

7. The image processing apparatus of claim 6, wherein the selected repeat pattern further causes the image processor to apply image size reduction to the grayscale data to generate the grayscale data having the reduced image size.

8. The image processing apparatus of claim 5, wherein when the type of the barcode in the image data indicates that the barcode is easily detected using the contrast correction function, the controller selects the repeat pattern that causes the image processor to apply smoothing to the image data.

9. The image processing apparatus of claim 3, wherein the processing order information of at least one of the plurality of repeat patterns is determined such that the plurality of types of image processing to be sequentially applied by the image processor have substantially different characteristics.

10. The image processing apparatus of claim 9, wherein the retry number information of the at least one of the plurality of repeat patterns is determined so as to require the image processor and the barcode detector to obtain at least two successful detection results having the same information from two different processed image data respectively generated by applying the plurality of types of image processing having substantially different characteristics.

11. The image processing apparatus of claim 10, wherein the retry number information of the at least one of the plurality of repeat patterns is determined so as to require the image processor and the barcode detector to obtain only one successful detection result when the barcode detector obtains the successful detection result from the image data generated by applying image processing that does not substantially change information contained in the image data.

12. The image processing apparatus of claim 11, wherein the image processing that does not substantially change information includes rotating the image data by a predetermined degree.

13. The image processing apparatus of claim 9, wherein the controller selects one of the plurality of retry patterns based on at least one of: 1) information regarding the barcode in the image data; and 2) a user instruction indicating whether a fast processing mode or a high quality mode is selected, so as to control the retry operations according to the selected retry pattern having the retry number information that requires the image processor to obtain a number of successful detection results determined based on at least one of the information regarding the barcode and the user instruction.

14. The image processing apparatus of claim 1, further comprising:
- a retry operation result collecting processor configured to collect a retry operation result indicating a result of performing the plurality of retry operations, the retry operation result including at least one of: 1) information indicating the total number of the plurality of retry operations performed by the image processor and the barcode detector to obtain the one or more successful detection results; 2) information indicating the processing time required for performing each retry operation or the plurality of retry operations; and 3) detection probability information indicating the number of successful detection results obtained after performing each retry operation or the plurality of retry operations; and
- a train data controller configured to modify the plurality of retry patterns stored in the storage device based on the retry operation result.

15. The image processing apparatus of claim 14, further comprising:
- an alert processor configured to send an alert message based on the retry operation result.

16. The image processing apparatus of claim 1, wherein the barcode detector includes:
- a barcode location detector configured to extract an area that is assumed to include the barcode from the input image data as a firstly extracted section, wherein
- the controller causes the image processor and the barcode detector to perform the plurality of retry operations on the firstly extracted section of the image data.

17. The image processing apparatus of claim 1, further comprising:
- a barcode detection result output configured to set bibliographic information for the image data based on information obtained from the one or more successful detection results, to divide the image data into a plurality of sections using information regarding a location of the detected barcode, and to send the image data section by section to a network.

18. The image processing apparatus of claim 17, further comprising:
- a scanner configured to scan an original document into the image data.

19. The image processing apparatus of claim 1, further comprising:
- a memory configured to store a plurality of retry patterns each specifying a combination of the retry operations to be performed by the image processor and the barcode detector, wherein
- the controller selects one of the plurality of retry patterns and controls the retry operations according to the selected retry pattern.

20. An image processing system, comprising:
- an image data generating apparatus configured to generate image data having a barcode;
- an image processing apparatus configured to receive the image data from the image data generating apparatus through a network, wherein the image processing apparatus includes:
  - a barcode detector configured to perform a barcode detection analysis operation of detecting and analyzing a barcode in the image data to generate a barcode detection result;
- an image processor configured to perform an image processing operation of applying image processing to the image data to generate processed image data when the barcode detection result indicates an error in barcode detection or analysis; and
- a controller configured to cause the image processor and the barcode detector to sequentially perform a plurality of retry operations each of which including a set of the image processing operation and the barcode detection analysis operation until one or more successful detection results are obtained, while causing the image processor to change a type of the image processing being applied for each retry operation.

21. The image processing system of claim 20, wherein the image processing apparatus further includes:
- a memory configured to store a plurality of retry patterns each specifying a combination of the retry operations to be performed by the image processor and the barcode detector, wherein
- the controller selects one of the plurality of retry patterns and controls the retry operations according to the selected retry pattern.

22. The image processing system of claim 20, wherein the image processing apparatus further includes:
- a storage device configured to store a plurality of retry patterns each retry pattern including at least one of: 1) image processing type information indicating a plurality of types of the image processing to be applied by the image processor; 2) processing order information indicating the order of applying the plurality of types of the image processing as the retry operations are sequentially performed; and 3) retry number information indicating a sufficient number of the successful detection results the image processing apparatus requires before completing the retry operations, wherein
- the controller selects one of the plurality of retry patterns and controls the retry operations according to at least one of the image processing type information, the processing order information, and the retry number information obtained from the selected retry pattern.

23. An image processing method, comprising:
- performing a barcode detection analysis operation of detecting and analyzing a barcode in image data to generate a barcode detection result;
- performing an image processing operation of applying image processing to the image data to generate processed image data when the barcode detection result indicates an error in barcode detection or analysis; and
- sequentially performing a plurality of retry operations each of which including a set of the image processing operation and the barcode detection analysis operation until one or more successful detection results are obtained, while changing a type of the image processing being applied for each retry operation.

24. The image processing method of claim 23, further comprising:

storing a plurality of retry patterns in a memory, each retry pattern including at least one of: 1) image processing type information indicating a plurality of types of the image processing to be applied by the image processor; 2) processing order information indicating the order of applying the plurality of types of the image processing as the retry operations are sequentially performed; and 3) retry number information indicating a sufficient number of the successful detection results the image processing apparatus requires before completing the retry operations;

selecting one of the plurality of retry patterns; and controlling the retry operations according to at least one of the image processing type information, the processing order information, and the retry number information obtained from the selected retry pattern.

* * * * *